United States Patent
Liu et al.

(10) Patent No.: US 10,149,322 B2
(45) Date of Patent: Dec. 4, 2018

(54) CHANNEL CONTENTION METHOD AND APPARATUS

(71) Applicant: Huawei Technologies Co., Ltd., Shenzhen (CN)

(72) Inventors: Yalin Liu, Shanghai (CN); Jun Zhu, Shanghai (CN); Jiayin Zhang, Shanghai (CN); Tianyu Wu, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 107 days.

(21) Appl. No.: 15/220,258

(22) Filed: Jul. 26, 2016

(65) Prior Publication Data

US 2016/0338106 A1 Nov. 17, 2016

Related U.S. Application Data

(63) Continuation of application No. PCT/CN2014/092132, filed on Nov. 25, 2014.

(30) Foreign Application Priority Data

Jan. 27, 2014 (WO) ................ PCT/CN2014/071585

(51) Int. Cl.
*H04W 72/04* (2009.01)
*H04W 74/08* (2009.01)
*H04W 72/12* (2009.01)
*H04W 88/02* (2009.01)

(52) U.S. Cl.
CPC .... *H04W 74/0816* (2013.01); *H04W 72/0413* (2013.01); *H04W 72/1263* (2013.01); *H04W 88/02* (2013.01)

(58) Field of Classification Search
None
See application file for complete search history.

(56) References Cited

U.S. PATENT DOCUMENTS

| 2005/0058097 A1* | 3/2005 | Kang .................... H04W 72/08 370/329 |
| 2005/0180341 A1* | 8/2005 | Nelson .................. H04N 7/147 370/260 |
| 2010/0165907 A1 | 7/2010 | Chu et al. |
| 2012/0106426 A1 | 5/2012 | Hart et al. |

(Continued)

FOREIGN PATENT DOCUMENTS

| CN | 1578239 A | 2/2005 |
| CN | 102065517 A | 5/2011 |

(Continued)

*Primary Examiner* — Ayanah George
(74) *Attorney, Agent, or Firm* — Slater Matsil, LLP

(57) ABSTRACT

Embodiments provide a channel contention method and apparatus. The channel contention apparatus belongs to a basic service set (BSS). The BSS includes an access point (AP) and at least one first station (STA). Both the AP and the at least one first STA participate in channel contention. The apparatus is the AP or any first STA. The apparatus includes a sensing module configured to sense a channel. The apparatus also includes a contention module configured to contend for the channel. The AP centrally performs control and scheduling so that all of at least one network device in the BSS can transmit data by using the channel.

24 Claims, 9 Drawing Sheets

(56) References Cited

U.S. PATENT DOCUMENTS

2012/0163216 A1    6/2012  Park et al.
2012/0243485 A1*  9/2012  Merlin .................. H04W 28/20
                                                                   370/329

FOREIGN PATENT DOCUMENTS

| CN | 102413582 A | 4/2012 |
| CN | 103067985 A | 4/2013 |
| CN | 103298135 A | 9/2013 |
| CN | 103379657 A | 10/2013 |
| EP | 2819480 A1 | 12/2014 |
| WO | 2004047346 A1 | 6/2004 |
| WO | 2011102652 A2 | 8/2011 |

* cited by examiner

First STA 12

CHANNEL CONTENTION METHOD AND APPARATUS

CROSS-REFERENCE TO RELATED APPLICATIONS

This application is a continuation of International Application No. PCT/CN2014/092132, filed on Nov. 25, 2014, which claims priority to International Patent Application No. PCT/CN2014/071585, filed on Jan. 27, 2014, both of which are hereby incorporated by reference in their entireties.

TECHNICAL FIELD

The present disclosure relates to communications technologies, and in particular embodiments, to a channel contention method and apparatus.

BACKGROUND

On an existing wireless local area network (WLAN for short), a carrier sense multiple access (CSMA for short) with collision avoidance (CA for short) protocol is used at a Media Access Control (MAC for short) layer, to avoid a conflict that occurs on a channel when multiple network devices need to transmit data. In the CSMA/CA protocol, a network device that needs to send data contends for a channel.

Currently, to further improve a throughput of a WLAN, a scheduling mode is introduced in an 802.11 standard of Institute of Electrical and Electronics Engineers (IEEE for short), and a WLAN system becomes a high efficiency wireless local area network (HEW for short) system. In a WLAN system to which a scheduling mode is introduced, a basic service set (BSS for short) is used as a basic scheduling set, and when data transmission needs to be performed for a BSS, a channel is contended for according to the CSMA/CA protocol, which causes a relatively low success rate, and cannot meet a service requirement of the entire BSS.

SUMMARY

Embodiments provide a channel contention method and apparatus, to resolve a problem of low channel contention success rate for a BSS in a WLAN system.

According to a first aspect, an embodiment provides a channel contention apparatus, where the apparatus belongs to a basic service set (BSS). The BSS includes an access point AP and at least one first station STA. Both the AP and the at least one first STA participate in channel contention. The apparatus is the AP or any first STA, and the apparatus includes a sensing module, configured to sense a channel; and a contention module, configured to contend for the channel. The AP centrally performs control and scheduling so that all of at least one network device in the BSS can transmit data by using the channel.

With reference to the first aspect, in a first possible implementation manner of the first aspect, the contention module is configured to obtain the channel by means of contention by successfully sending a channel contention frame when the sensing module senses that the channel is in an idle state.

With reference to the first aspect or the first possible implementation manner of the first aspect, in a second possible implementation manner of the first aspect, the channel contention frame is a request to send RTS frame. The RTS frame includes transmission duration, a receiver address RA, and a transmitter address TA. The transmission duration is scheduling duration needed by the network device in the BSS, and the RA is identifier information that the AP and the at least one first STA have agreed on in advance.

With reference to the second possible implementation manner of the first aspect, in a third possible implementation manner of the first aspect, the apparatus is the AP, the AP further includes a scheduling module, and the contention module of the AP is specifically configured to obtain the channel by means of contention by successfully sending the RTS frame, where the TA in the RTS frame is an address of the AP when the sensing module senses that the channel is in an idle state. The RTS frame is used so that the at least one first STA learns successful channel contention according to the RTS frame, and continues to sense the channel to receive a control frame that is sent by the AP and that is used to control data transmission. A second STA learns, according to the RTS frame, that the channel has been occupied, and sets a network allocation vector NAV of the second STA according to the transmission duration in the RTS frame, to perform contention backoff. The second STA is a station that does not belong to the BSS. The scheduling module is configured to send the control frame, so that the at least one first STA transmits data.

With reference to the third possible implementation manner of the first aspect, in a fourth possible implementation manner of the first aspect, the AP further includes a receiving module, configured to receive a CTS frame returned by the at least one first STA.

With reference to the second possible implementation manner of the first aspect, in a fifth possible implementation manner of the first aspect, the apparatus is any first STA in the BSS, and the contention module of the first STA is configured to, when the sensing module senses that the channel is in an idle state, obtain the channel by means of contention by successfully sending the RTS frame. The TA in the RTS frame is an address of the AP or an address of the first STA that successfully sends the RTS. The RTS frame is used so that another first STA learns successful channel contention according to the RTS frame. The at least one first STA continues to sense the channel to receive a control frame that is sent by the AP and that is used to control data transmission. The another first STA is a first STA, in the BSS, except the first STA that successfully sends the RTS frame. A second STA learns, according to the RTS frame, that the channel has been occupied, and sets a network allocation vector NAV of the second STA according to the transmission duration in the RTS frame, to perform contention backoff. The second STA is a station that does not belong to the BSS, and the AP sends the control frame, so that the at least one first STA transmits data.

With reference to the second possible implementation manner of the first aspect, in a sixth possible implementation manner of the first aspect, the apparatus is any first STA in the BSS, and the contention module of the first STA is configured to, when the sensing module senses that the channel is in an idle state, obtain the channel by means of contention by successfully sending the RTS frame, where the TA in the RTS frame is an address of the AP or an address of the first STA that successfully sends the RTS. The RTS frame is used so that the AP returns a CTS frame to the at least one first STA. Another first STA learns successful channel contention according to the RTS frame or the CTS frame. The at least one first STA continues to sense the channel to receive a control frame that is sent by the AP and that is used to control data transmission. The another first STA is a first STA, in the BSS, except the first STA that successfully sends the RTS frame. A second STA learns, according to the RTS frame or the CTS frame, that the channel has been occupied, and sets a network allocation vector NAV of the second STA according to the transmission duration in the RTS frame or the CTS frame, to perform contention backoff. The second STA is a station that does not belong to the BSS, and the AP sends the control frame, so that the at least one first STA transmits data.

With reference to the first aspect or the first possible implementation manner of the first aspect, in a seventh possible implementation manner of the first aspect, the channel contention frame is a clear to send CTS frame. The CTS frame includes frame control information, transmission duration, a receiver address RA, and frame control sequence FCS information. The transmission duration is scheduling duration needed by the network device in the BSS, and the RA is identifier information that the AP and the at least one first STA have agreed on in advance.

With reference to the seventh possible implementation manner of the first aspect, in an eighth possible implementation manner of the first aspect, the apparatus is the AP, the AP further includes a scheduling module, and the contention module of the AP is configured to, when the sensing module senses that the channel is in an idle state, obtain the channel by means of contention by successfully sending a CTS frame. The CTS frame is used so that the at least one first STA learns successful channel contention according to the CTS frame, and continues to sense the channel to receive a control frame that is sent by the AP and that is used to control data transmission. A second STA learns, according to the CTS frame, that the channel has been occupied, and sets a network allocation vector NAV of the second STA according to the transmission duration in the CTS frame, to perform contention backoff. The second STA is a station that does not belong to the BSS. The scheduling module is configured to send the control frame, so that the at least one first STA transmits data.

With reference to the eighth possible implementation manner of the first aspect, in a ninth possible implementation manner of the first aspect, the AP further includes a receiving module, configured to receive a CTS frame returned by the at least one first STA.

With reference to the seventh possible implementation manner of the first aspect, in a tenth possible implementation manner of the first aspect, the apparatus is any first STA in the BSS, and the contention module of the first STA is configured to, when the sensing module senses that the channel is in an idle state, obtain the channel by means of contention by successfully sending a CTS frame. The CTS frame is used so that another first STA learns successful channel contention according to the CTS frame. The at least one first STA continues to sense the channel to receive a control frame that is sent by the AP and that is used to control data transmission. The another first STA is a first STA, in the BSS, except the first STA that successfully sends the CTS frame. A second STA learns, according to the CTS frame, that the channel has been occupied, and sets a network allocation vector NAV of the second STA according to the transmission duration in the CTS frame, to perform contention backoff. The second STA is a station that does not belong to the BSS, and the AP sends the control frame, so that the at least one first STA transmits data.

With reference to the seventh possible implementation manner of the first aspect, in an eleventh possible implementation manner of the first aspect, the apparatus is any first STA in the BSS, and the contention module of the first STA is configured to, when the sensing module senses that the channel is in an idle state, obtain the channel by means of contention by successfully sending a CTS frame. The CTS frame is used so that the AP returns, to the at least one first STA, a CTS frame used for feedback. Another first STA learns successful channel contention according to the CTS frame or the CTS frame used for feedback. The at least one first STA continues to sense the channel to receive a control frame that is sent by the AP and that is used to control data transmission. The another first STA is a first STA, in the BSS, except the first STA that successfully sends the CTS frame. A second STA learns, according to the CTS frame or the CTS frame used for feedback, that the channel has been occupied, and sets a network allocation vector NAV of the second STA according to the transmission duration in the CTS frame or the CTS frame used for feedback, to perform contention backoff. The second STA is a station that does not belong to the BSS, and the AP sends the control frame, so that the at least one first STA transmits data.

With reference to the first aspect or the first possible implementation manner of the first aspect, in a twelfth possible implementation manner of the first aspect, the apparatus is any first STA in the BSS, and the contention module of the first STA is configured to, when the sensing module senses that the channel is in an idle state, obtain the channel by means of contention by successfully sending a help-AP-to-send HTS frame. The HTS frame includes transmission duration, a receiver address RA, and a transmitter address TA. The transmission duration is scheduling duration needed by the network device in the BSS. The RA is identifier information that the AP and the at least one first STA have agreed on in advance. The TA is identifier information that the AP and the at least one first STA have agreed on in advance. The HTS frame is used so that the AP sends an RTS frame or a CTS frame to the at least one first STA. Another first STA learns successful channel contention according to the RTS frame or the CTS frame. The at least one first STA simultaneously returns a CTS frame, and continues to sense the channel to receive a control frame that is sent by the AP and that is used to control data transmission. The another first STA is a first STA, in the BSS, except the first STA that successfully sends the HTS frame. A second STA learns, according to the HTS frame, the RTS frame, or the CTS frame, that the channel has been occupied, and sets a network allocation vector NAV of the second STA according to the transmission duration in the HTS frame, the RTS frame, or the CTS frame, to perform contention backoff. The second STA is a station that does not belong to the BSS, and the AP sends the control frame, so that the at least one first STA transmits data.

With reference to the twelfth possible implementation manner of the first aspect, in a thirteenth possible implementation manner of the first aspect, the RA in the HTS frame is a Media Access Control MAC address of the AP, and the TA in the HTS frame is a MAC address of the first STA that successfully sends the RTS, the MAC address of the AP, or an identifier of the BSS, BSSID.

With reference to the first aspect or the first possible implementation manner of the first aspect, in a fourteenth possible implementation manner of the first aspect, the apparatus is any first STA in the BSS, and the contention module of the first STA is configured to, when the sensing module senses that the channel is in an idle state, obtain the channel by means of contention by successfully sending an HTS frame. The HTS frame includes transmission duration and a receiver address RA, the transmission duration is scheduling duration needed by the network device in the BSS, and the RA is identifier information that the AP and the at least one first STA have agreed on in advance. The HTS frame is used, so that the AP sends an RTS frame or a CTS frame to the at least one first STA. Another first STA learns successful channel contention according to the RTS frame or the CTS frame. The at least one first STA simultaneously returns a CTS frame, and continues to sense the channel to receive a control frame that is sent by the AP and that is used to control data transmission. The another first STA is a first STA, in the BSS, except the first STA that successfully sends the RTS frame. A second STA learns, according to the HTS frame, the RTS frame, or the CTS frame, that the channel has been occupied, and sets a network allocation vector NAV of the second STA according to the transmission duration in the HTS frame, the RTS frame, or the CTS frame, to perform contention backoff. The second STA is a station that does not belong to the BSS, and the AP sends the control frame, so that the at least one first STA transmits data.

With reference to the fourteenth possible implementation manner of the first aspect, in a fifteenth possible implementation manner of the first aspect, the RA in the HTS frame is a Media Access Control MAC address of the AP.

With reference to any one of the twelfth to fifteenth possible implementation manners of the first aspect, in a sixteenth possible implementation manner of the first aspect, if the AP sends information to all of the at least one first STA, the RA in the RTS frame sent by the AP is the BSSID, and the TA in the RTS frame sent by the AP is the MAC address of the AP. Or, if the AP sends information to a group of at least one first STA in the BSS, the RA in the RTS frame sent by the AP is a group number of the group to which the at least one first STA belongs, and the TA in the RTS frame sent by the AP is the MAC address of the AP.

According to a second aspect, an embodiment provides a channel contention method, including sensing, by a first device in a basic service set BSS, a channel, where the BSS includes an access point AP and at least one first station STA, and the first device is the AP or any first STA. The method also includes contending, by the first device, for the channel, where the AP centrally performs control and scheduling so that all of at least one network device in the BSS can transmit data by using the channel, and both the AP and the at least one first STA participate in channel contention.

With reference to the second aspect, in a first possible implementation manner of the second aspect, the contending, by the first device, for the channel includes sensing, by the first device, that the channel is in an idle state, and obtaining the channel by means of contention by successfully sending a channel contention frame.

With reference to the second aspect or the first possible implementation manner of the second aspect, in a second possible implementation manner of the second aspect, the channel contention frame is a request to send RTS frame. The RTS frame includes transmission duration, a receiver address RA, and a transmitter address TA. The transmission duration is scheduling duration needed by the network device in the BSS, and the RA is identifier information that the AP and the at least one first STA have agreed on in advance.

With reference to the second possible implementation manner of the second aspect, in a third possible implementation manner of the second aspect, the first device is the AP, and the contending, by the first device, for the channel, where the AP centrally performs control and scheduling so that all of the at least one network device in the BSS can transmit data by using the channel includes sensing, by the AP, that the channel is in an idle state, and obtaining the channel by means of contention by successfully sending the RTS frame, where the TA in the RTS frame is an address of the AP. The RTS frame is used, so that the at least one first STA learns successful channel contention according to the RTS frame, and continues to sense the channel to receive a control frame that is sent by the AP and that is used to control data transmission. A second STA learns, according to the RTS frame, that the channel has been occupied, and sets a network allocation vector NAV of the second STA according to the transmission duration in the RTS frame, to perform contention backoff. The second STA is a station that does not belong to the BSS. The AP centrally performing control and scheduling also includes sending, by the AP, the control frame, so that the at least one first STA transmits data.

With reference to the second possible implementation manner of the second aspect, in a fourth possible implementation manner of the second aspect, the first device is any first STA in the BSS, and the contending, by the first device, for the channel, where the AP centrally performs control and scheduling so that all of the at least one network device in the BSS can transmit data by using the channel includes sensing, by any first STA in the BSS, that the channel is in an idle state, and obtaining the channel by means of contention by successfully sending the RTS frame. The TA in the RTS frame is an address of the AP or an address of the first STA that successfully sends the RTS. The RTS frame is used, so that another first STA learns successful channel contention according to the RTS frame, the at least one first STA continues to sense the channel to receive a control frame that is sent by the AP and that is used to control data transmission. The another first STA is a first STA, in the BSS, except the first STA that successfully sends the RTS frame. A second STA learns, according to the RTS frame, that the channel has been occupied, and sets a network allocation vector NAV of the second STA according to the transmission duration in the RTS frame, to perform contention backoff. The second STA is a station that does not belong to the BSS, and the AP sends the control frame, so that the at least one first STA transmits data.

With reference to the second possible implementation manner of the second aspect, in a fifth possible implementation manner of the second aspect, the first device is any first STA in the BSS, and the contending, by the first device, for the channel, where the AP centrally performs control and scheduling so that all of the at least one network device in the BSS can transmit data by using the channel includes sensing, by any first STA in the BSS, that the channel is in an idle state, and obtaining the channel by means of contention by successfully sending the RTS frame. The TA in the RTS frame is an address of the AP or an address of the first STA that successfully sends the RTS. The RTS frame is used, so that the AP returns a CTS frame to the at least one first STA. Another first STA learns successful channel contention according to the RTS frame or the CTS frame. The at least one first STA continues to sense the channel to receive a control frame that is sent by the AP and that is used to control data transmission. The another first STA is a first STA, in the BSS, except the first STA that successfully sends the RTS frame. A second STA learns, according to the RTS frame or the CTS frame, that the channel has been occupied, and sets a network allocation vector NAV of the second STA according to the transmission duration in the RTS frame or the CTS frame, to perform contention backoff. The second STA is a station that does not belong to the BSS, and the AP sends the control frame, so that the at least one first STA transmits data.

With reference to the second aspect or the first possible implementation manner of the second aspect, in a sixth possible implementation manner of the second aspect, the channel contention frame is a clear to send CTS frame, the CTS frame includes transmission duration and a receiver address RA, the transmission duration is scheduling duration needed by the network device in the BSS, and the RA is identifier information that the AP and the at least one first STA have agreed on in advance.

With reference to the sixth possible implementation manner of the second aspect, in a seventh possible implementation manner of the second aspect, the first device is the AP, and the contending, by the first device, for the channel, where the AP centrally performs control and scheduling so that all of the at least one network device in the BSS can transmit data by using the channel includes sensing, by the AP, that the channel is in an idle state, and obtaining the channel by means of contention by successfully sending a CTS frame. The CTS frame is used, so that the at least one first STA learns successful channel contention according to the CTS frame, and continues to sense the channel to receive a control frame that is sent by the AP and that is used to control data transmission. A second STA learns, according to the CTS frame, that the channel has been occupied, and sets a network allocation vector NAV of the second STA according to the transmission duration in the CTS frame, to perform contention backoff. The second STA is a station that does not belong to the BSS. The AP centrally performing control and scheduling also includes sending, by the AP, the control frame, so that the at least one first STA transmits data.

With reference to the sixth possible implementation manner of the second aspect, in an eighth possible implementation manner of the second aspect, the first device is any first STA in the BSS, and the contending, by the first device, for the channel, where the AP centrally performs control and scheduling so that all of the at least one network device in the BSS can transmit data by using the channel includes sensing, by any first STA in the BSS, that the channel is in an idle state, and obtaining the channel by means of contention by successfully sending a CTS frame. The CTS frame is used, so that another first STA learns successful channel contention according to the CTS frame. The at least one first STA continues to sense the channel to receive a control frame that is sent by the AP and that is used to control data transmission. The another first STA is a first STA, in the BSS, except the first STA that successfully sends the CTS frame. A second STA learns, according to the CTS frame, that the channel has been occupied, and sets a network allocation vector NAV of the second STA according to the transmission duration in the CTS frame, to perform contention backoff. The second STA is a station that does not belong to the BSS, and the AP sends the control frame, so that the at least one first STA transmits data.

With reference to the sixth possible implementation manner of the second aspect, in a ninth possible implementation manner of the second aspect, the first device is any first STA in the BSS, and the contending, by the first device, for the channel, where the AP centrally performs control and scheduling so that all of the at least one network device in the BSS can transmit data by using the channel includes sensing, by any first STA in the BSS, that the channel is in an idle state, and obtaining the channel by means of contention by successfully sending a CTS frame. The CTS frame is used, so that the AP returns, to the at least one first STA, a CTS frame used for feedback. Another first STA learns successful channel contention according to the CTS frame or the CTS frame used for feedback. The at least one first STA continues to sense the channel to receive a control frame that is sent by the AP and that is used to control data transmission. The another first STA is a first STA, in the BSS, except the first STA that successfully sends the CTS frame. A second STA learns, according to the CTS frame or the CTS frame used for feedback, that the channel has been occupied, and sets a network allocation vector NAV of the second STA according to the transmission duration in the CTS frame or the CTS frame used for feedback, to perform contention backoff. The second STA is a station that does not belong to the BSS, and the AP sends the control frame, so that the at least one first STA transmits data.

With reference to the second aspect or the first possible implementation manner of the second aspect, in a tenth possible implementation manner of the second aspect, the first device is any first STA in the BSS, and the contending, by the first device, for the channel, where the AP centrally performs control and scheduling so that all of the at least one network device in the BSS can transmit data by using the channel includes sensing, by any first STA in the BSS, that the channel is in an idle state, and obtaining the channel by means of contention by successfully sending a help-AP-to-send HTS frame. The HTS frame includes transmission duration, a receiver address RA, and a transmitter address TA. The transmission duration is scheduling duration needed by the network device in the BSS. The RA is identifier information that the AP and the at least one first STA have agreed on in advance, and the TA is identifier information that the AP and the at least one first STA have agreed on in advance. The HTS frame is used, so that the AP returns an RTS frame or a CTS frame to the at least one first STA. Another first STA learns successful channel contention according to the RTS frame or the CTS frame. The at least one first STA simultaneously returns a CTS frame, and continues to sense the channel to receive a control frame that is sent by the AP and that is used to control data transmission. The another first STA is a first STA, in the BSS, except the first STA that successfully sends the RTS frame. A second STA learns, according to the HTS frame, the RTS frame, or the CTS frame, that the channel has been occupied, and sets a network allocation vector NAV of the second STA according to the transmission duration in the HTS frame, the RTS frame, or the CTS frame, to perform contention backoff. The second STA is a station that does not belong to the BSS, and the AP sends the control frame, so that the at least one first STA transmits data.

With reference to the tenth possible implementation manner of the second aspect, in an eleventh possible implementation manner of the second aspect, the RA in the HTS frame is a Media Access Control MAC address of the AP, and the TA in the HTS frame is a MAC address of the first STA that successfully sends the RTS, the MAC address of the AP, or an identifier of the BSS, BSSID.

With reference to the second aspect or the first possible implementation manner of the second aspect, in a twelfth possible implementation manner of the second aspect, the first device is any first STA in the BSS, and the contending, by the first device, for the channel, where the AP centrally performs control and scheduling so that all of the at least one network device in the BSS can transmit data by using the channel includes sensing, by any first STA in the BSS, that the channel is in an idle state, and obtaining the channel by means of contention by successfully sending an HTS frame. The HTS frame includes transmission duration and a receiver address RA. The transmission duration is scheduling duration needed by the network device in the BSS, and the RA is identifier information that the AP and the at least one first STA have agreed on in advance. The HTS frame is used, so that the AP returns an RTS frame or a CTS frame to the at least one first STA. Another first STA learns successful channel contention according to the RTS frame. The at least one first STA simultaneously returns a CTS frame, and continues to sense the channel to receive a control frame that is sent by the AP and that is used to control data transmission. The another first STA is a first STA, in the BSS, except the first STA that successfully sends the RTS frame. A second STA learns, according to the HTS frame, the RTS frame, or the CTS frame, that the channel has been occupied, and sets a network allocation vector NAV of the second STA according to the transmission duration in the HTS frame, the RTS frame, or the CTS frame, to perform contention backoff. The second STA is a station that does not belong to the BSS, and the AP sends the control frame, so that the at least one first STA transmits data.

With reference to the twelfth possible implementation manner of the second aspect, in a thirteenth possible implementation manner of the second aspect, the RA in the HTS frame is a Media Access Control MAC address of the AP.

With reference to any one of the tenth to thirteenth possible implementation manners of the second aspect, in a fourteenth possible implementation manner of the second aspect, if the AP sends information to all of the at least one first STA, the RA in the RTS frame sent by the AP is the BSSID, and the TA in the RTS frame sent by the AP is the MAC address of the AP; or if the AP sends information to a group of at least one first STA in the BSS, the RA in the RTS frame sent by the AP is a group number of the group to which the at least one first STA belongs, and the TA in the RTS frame sent by the AP is the MAC address of the AP.

According to the channel contention method and apparatus in the embodiments, all network devices, including an AP and a STA, in a BSS of a WLAN system participate in channel contention, and after any network device obtains a channel by means of contention, the AP can centrally control and schedule the network devices, so that all the network devices in the BSS can transmit data in a subsequent period of time by using the channel obtained by means of contention, and do not need to perform contention again, thereby improving a channel contention success rate and data transmission efficiency of a network device in the BSS.

BRIEF DESCRIPTION OF THE DRAWINGS

To describe the technical solutions in the embodiments more clearly, the following briefly describes the accompanying drawings required for describing the embodiments or the prior art. Apparently, the accompanying drawings in the following description show some embodiments, and persons of ordinary skill in the art may still derive other drawings from these accompanying drawings without creative efforts.

DETAILED DESCRIPTION OF ILLUSTRATIVE EMBODIMENTS

Figure 1:
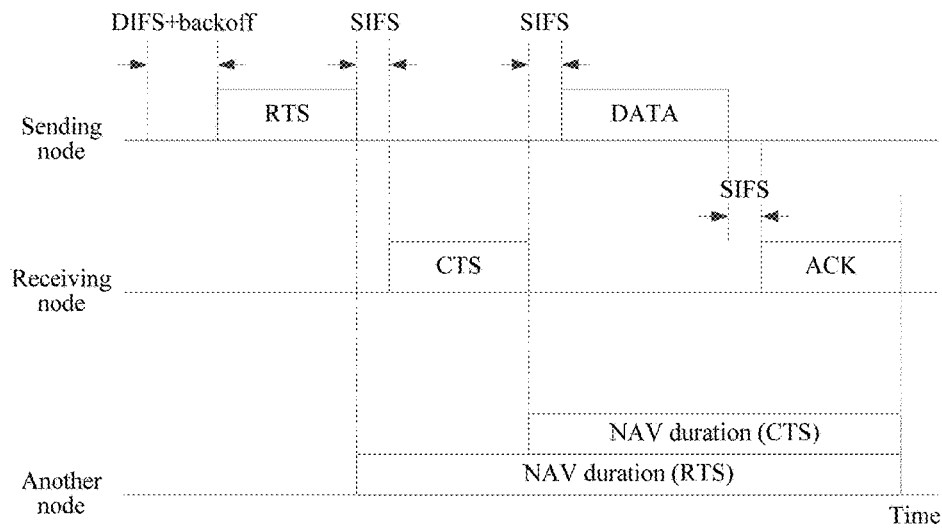
FIG. 1 is a schematic diagram of a collision backoff mechanism of a CSMA/CA protocol.

FIG. 1 is a schematic diagram of a collision backoff mechanism of a CSMA/CA protocol. As shown in FIG. 1, in the CSMA/CA protocol, a sending node first senses a channel for one piece of distributed coordination function interframe space (DIFS for short) duration, and performs a backoff process if sensing that the channel is idle, and after backoff ends, the node may send a request to send (RTS for short) frame if the channel is still idle. After receiving the RTS frame, a receiving node returns a clear to send (CTS for short) frame after short interframe space (SIFS for short) duration. After receiving the RTS or CTS frame, another node sets a network allocation vector (NAV for short) of the another node according to a transmission duration value in the RTS frame or the CTS frame, and postpones a sending time of the another node. After receiving the CTS frame, the sending node sends a data frame after SIFS duration. After receiving the DATA frame, the receiving node responds by returning an acknowledgement (ACK for short) frame.

The foregoing RTS/CTS mechanism is a protection mechanism introduced in an IEEE 802.11 standard, and allows only one network device to perform access and transmit data within a same period of time, thereby effectively protecting a frame sequence from being interfered by neighboring devices at an initiating end and a receive end.

To further improve a throughput, the IEEE 802.11 working group establishes the HEW study group in 2013, and prepares to introduce technologies such as orthogonal frequency division multiple access (OFDMA for short) and scheduling to the IEEE 802.11 standard. A HEW system works in an unlicensed band, and in a case of sharing a channel with a system of the IEEE 802.11 standard, a channel contention mechanism is particularly important. On one hand, compatibility needs to be ensured, an HEW system can contend for a channel together with a STA in a standard such as IEEE 802.11a, IEEE 802.11n, or IEEE 802.11ac. After the HEW system successfully performs contention, another STA sets a NAV to postpone a sending time of the another STA, where a length of the NAV needs to be equal to a length of a subsequent scheduling window of an HEW BSS. On the other hand, the HEW system enters a scheduling mode after obtaining a channel by means of contention, and an access point (AP for short) and a station (STA for short) in a same BSS both need to use the channel according to a scheduling instruction. Therefore, a channel contention success rate needs to be improved to meet a service requirement of the entire BSS.

However, in the existing RTS/CTS mechanism, a case in which a scheduling mode is introduced is not considered, and only a network device that needs to send data participates in channel contention by sending an RTS frame, that is, if an AP needs to send data, the AP contends for a channel, and if a STA needs to send data, the STA contends for a channel. In this method, a channel contention success probability of a BSS is not high. Therefore, a new channel contention apparatus and method need to be designed to meet the foregoing requirement.

To make the objectives, technical solutions, and advantages of the embodiments clearer, the following clearly and completely describes the technical solutions in the embodiments with reference to the accompanying drawings in the embodiments. Apparently, the described embodiments are some but not all of the embodiments. All other embodiments obtained by persons of ordinary skill in the art based on the embodiments without creative efforts shall fall within the protection scope of the present disclosure.

Figure 2:
FIG. 2 is a schematic structural diagram of Embodiment 1 of a channel contention apparatus.

FIG. 2 is a schematic structural diagram of Embodiment 1 of a channel contention apparatus. As shown in FIG. 2, the apparatus in this embodiment belongs to a BSS, the BSS includes an access point AP and at least one first station STA, both the AP and the at least one first STA participate in channel contention, the apparatus may be the AP or any first STA, and the apparatus may include a sensing module 11 and a contention module 12. The sensing module 11 is configured to sense a channel, and the contention module 12 is configured to obtain the channel by means of contention, where the AP centrally performs control and scheduling so that all network devices in the BSS can transmit data by using the channel.

In this embodiment, the channel contention apparatus belongs to the BSS. The BSS is a basic service set on a WLAN to which a scheduling mode is introduced, and includes the AP and the at least one first STA, both the AP and the at least one first STA participate in channel contention. The first STA is a station of an HEW standard and can support technologies such as OFDMA and scheduling. Regardless of whether the AP or the first STA obtains a channel by means of contention, the entire BSS can transmit data by using the channel. Channel contention network devices further include a second STA in addition to the entire BSS. The second STA does not belong to the BSS, and may be any STA in IEEE 802.11 series of standards. The second STA interferes with the first STA. Therefore, after the BSS successfully obtains a channel by means of contention, the second STA enters a waiting mode, and starts to contend for a channel after a scheduling mode of the BSS ends, which avoids interference to the first STA. The channel contention apparatus in this embodiment may be the AP in the BSS, or may be any first STA in the BSS. The sensing module 11 of the channel contention apparatus needs to sense a channel before the apparatus obtains the channel by means of contention, to determine a state of the channel, after the contention module 12 obtains the channel by means of contention, permission to control the channel is transferred to the AP in the BSS, and the AP centrally controls and schedules the channel so that all the network devices in the BSS can transmit data by using the channel, as scheduled by the AP.

As any network device in the BSS, the apparatus in this embodiment senses a channel and obtains the channel by means of contention, and then the AP centrally controls and schedules the network devices in the BSS, so that all the network devices in the BSS can transmit data in a subsequent period of time by using the channel obtained by means of contention, and do not need to perform contention again, thereby improving a channel contention success rate and data transmission efficiency of a network device in the BSS. Specifically, the AP and all first STAs in the BSS all participate in channel contention, and regardless of which obtains a channel by means of contention, permission to manage the channel is transferred to the AP, and the AP performs allocation for usage. For example, the AP needs to obtain a channel by means of contention and enters a scheduling mode, and in this case, not only the AP participates in channel contention, but also all first STAs in the BSS participate in channel contention for the AP to use. After the channel is obtained by means of contention, regardless of whether the AP or any first STA successfully performs contention, permission to control the channel and permission to manage the channel are transferred to the AP, and the AP centrally schedules and allocates the channel. As can be known from this, in this embodiment, network devices that participate in channel contention include network devices in the entire BSS regardless of whether the network devices need to send data, thereby greatly improving a channel contention success rate of the BSS.

Further, based on the foregoing apparatus, the contention module 12 is configured to, when the sensing module 11 senses that the channel is in an idle state, obtain a channel by means of contention by successfully sending a channel contention frame. Optionally, the channel contention frame may also be referred to as a channel reservation frame (CRF for short), which is not specifically limited in this embodiment.

Figure 3:
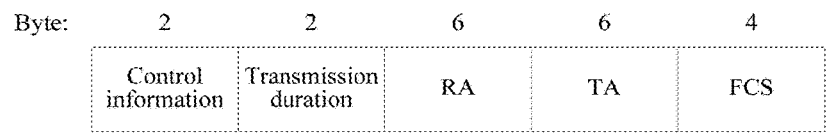
FIG. 3 is a schematic diagram of a format of an RTS frame.

Preferably, the contention module 12 may obtain the channel by means of contention by successfully sending an RTS frame, where the RTS frame includes transmission duration, a receiver address (RA for short), and a transmitter address (TA for short). To maintain consistent with an existing RTS frame in format, the RTS frame in this embodiment may further include frame control information and frame control sequence (FCS for short) information, where the transmission duration is scheduling duration needed by the BSS, and the RA is identifier information that the AP and the at least one first STA have agreed on in advance. Optionally, the transmission duration may also be maximum duration that is allowed to be set, and in the present disclosure, the maximum duration that is allowed to be set may be limited in two manners. In one manner, maximum limited transmission duration has been agreed on in advance within a local regional range, and in the other manner, a maximum value may be set according to a quantity of bits occupied by the transmission duration. FIG. 3 is a schematic diagram of a format of an RTS frame. As shown in FIG. 3, the RTS frame in this embodiment may be a frame specially used for an HEW system, and has 20 bytes in total, where the control information has two bytes, the transmission duration has two bytes, the RA has six bytes, the TA has six bytes, and the FCS information has four bytes. A format of an HEW RTS frame is completely consistent with a format of an RTS frame in an IEEE 802.11 standard, so that all STAs, including the first STA and the second STA, can receive and demodulate the RTS frame. Each HEW RTS frame occupies a bandwidth of 20 megahertz (MHz for short), there are 64 subcarriers at the bandwidth of 20 MHz, and a quantity and locations of pilot subcarriers are also the same as those of the RTS frame in the IEEE 802.11 standard. If there is a bandwidth of 80 MHz, an HEW RTS frame is separately sent at each bandwidth of 20 MHz. A difference from the RTS frame in the IEEE 802.11 standard lies in that, in the HEW RTS frame, the transmission duration is scheduling duration needed by the BSS, that is, total duration needed by the AP and the first STA that belong to the BSS to transmit data after the BSS successfully obtains a channel by means of contention. The second STA sets a NAV according to the transmission duration, to determine duration that needs to be waited for, and the first STA determines a size of a scheduling window by using the transmission duration. The RA is the identifier information that the AP and the first STA have agreed on in advance, and all first STAs in the BSS can acquire the identifier information, so that after the first STA demodulates the RTS frame to obtain the identifier information, the first STA knows that the RTS frame is an HEW RTS frame, and learns that the BSS has obtained the channel by means of contention and is about to enter the scheduling window. The RA may be set to any identifier information except a MAC address of the second STA, to avoid that the second STA incorrectly considers that the RTS frame is sent to the second STA. For example, the RA may be a MAC address of the AP, identifier information of the BSS, or a group number of the first STA.

Figure 4:
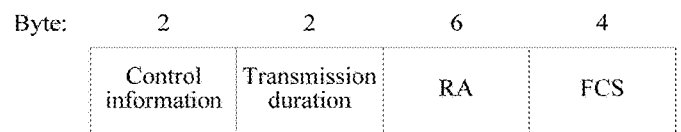
FIG. 4 is a schematic diagram of a format of a CTS frame.

Optionally, the contention module 12 may further obtain the channel by means of contention by successfully sending a CTS frame, where the CTS frame includes transmission duration and an RA. To maintain consistent with an existing CTS frame in format, the CTS frame in this embodiment may further include frame control information and FCS information, where the transmission duration is scheduling duration needed by the BSS, and the RA is identifier information that the AP and the at least one first STA have agreed on in advance. Optionally, the transmission duration may also be maximum duration that is allowed to be set, and in the present disclosure, the maximum duration that is allowed to be set may be limited in two manners. In one manner, maximum limited transmission duration has been agreed on in advance within a local regional range, and in the other manner, a maximum value may be set according to a quantity of bits occupied by the transmission duration. FIG. 4 is a schematic diagram of a format of a CTS frame. As shown in FIG. 4, the CTS frame in this embodiment may be a frame specially used for an HEW system, and has 14 bytes in total, where the control information has two bytes, the transmission duration has two bytes, the RA has six bytes, and the FCS information has four bytes. A format of an HEW CTS frame is completely consistent with a format of a CTS frame in an IEEE 802.11 standard, so that all STAs, including the first STA and the second STA, can receive and demodulate the CTS frame. A difference from the CTS frame in the IEEE 802.11 standard lies in that, in the HEW CTS frame, the transmission duration is scheduling duration needed by the BSS, that is, total duration needed by the AP and the first STA that belong to the BSS to transmit data after the BSS successfully obtains a channel by means of contention. The second STA sets a NAV according to the transmission duration, to determine duration that needs to be waited for, and the first STA determines a size of a scheduling window by using the transmission duration. The RA is the identifier information that the AP and the first STA have agreed on in advance, and all first STAs in the BSS can acquire the identifier information, so that after the first STA demodulates the CTS frame to obtain the identifier information, the first STA knows that the CTS frame is an HEW CTS frame, and learns that the BSS has obtained the channel by means of contention and is about to enter the scheduling window. The RA cannot be set to the MAC address of the second STA, to avoid that the second STA incorrectly considers that the CTS frame is sent to the second STA, and the RA cannot be set to a MAC address of the AP either, so that an HEW CTS frame is distinguished from a CTS frame sent by the second STA to the AP.

In this embodiment, an HEW RTS frame and an HEW CTS frame whose formats are the same as a format in an IEEE 802.11 standard are set, so that an HEW system is compatible with another IEEE 802.11 standard, which is easy to achieve. Different content is set for a same field so that the first station and the second station can clearly perform demodulation and learn a next action, which desirably resolves a problem of compatibility between the existing RTS/CTS mechanism and an HEW system.

Figure 6:
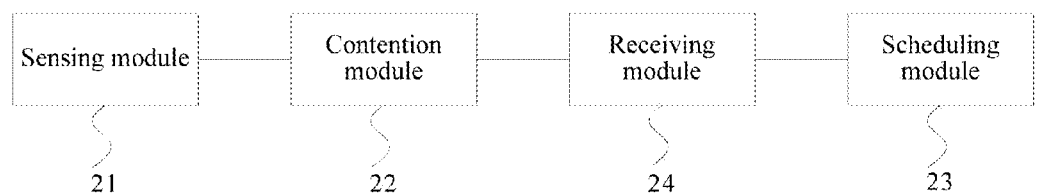
FIG. 6 is a schematic structural diagram of Embodiment 2 of a channel contention apparatus.
Figure 7:
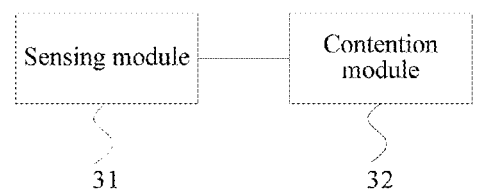
FIG. 7 is a schematic structural diagram of Embodiment 3 of a channel contention apparatus.

The following describes in detail the technical solution in any apparatus embodiment shown in FIG. 6 to FIG. 7 by using specific embodiments.

Figure 5:
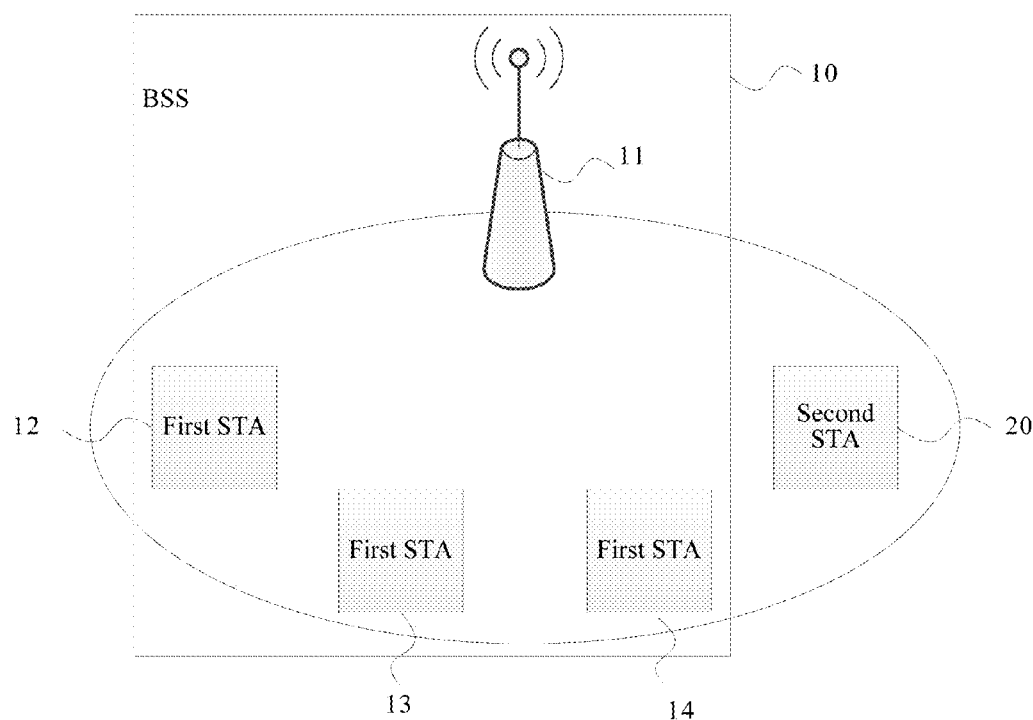
FIG. 5 is a schematic diagram of an application scenario of a channel contention apparatus.

FIG. 5 is a schematic diagram of an application scenario of a channel contention apparatus. As shown in FIG. 5, there is a BSS 10 of a WLAN system to which a scheduling mode is introduced and a second STA 20 in the application scenario, the BSS 10 includes one AP 11 and three first STAs 12, 13, and 14, and the second STA 20 is a station that complies with an IEEE 802.11a, 11g, 11n or 11ac standard. The AP 11 and the first STAs 12, 13, and 14 all sense a channel and participate in channel contention.

FIG. 6 is a schematic structural diagram of Embodiment 2 of a channel contention apparatus. Combining FIG. 5 and FIG. 6, the channel contention apparatus in this embodiment is the AP 11 in the BSS 10, and the AP 11 includes: a sensing module 21, a contention module 22, a scheduling module 23, and a receiving module 24. The sensing module 21 is configured to sense a channel. The contention module 22 is configured to: when the sensing module 21 senses that the channel is in an idle state, obtain the channel by means of contention by successfully sending an RTS frame. A TA in the RTS frame is an address of the AP 11, and the RTS frame is used, so that the first STAs 12, 13, and 14 learn, according to an RA and the TA in the RTS frame, that the BSS 10 successfully obtains the channel by means of contention, and continue to sense the channel to receive a control frame that is sent by the AP 11 and that is used to control data transmission. The second STA 20 learns, according to the RTS frame, that the channel has been occupied and sets a network allocation vector NAV of the second STA 20 according to transmission duration in the RTS frame, to perform contention backoff. The scheduling module 23 is configured to send the control frame, so that the first STAs 12, 13 or 14 transmits data. The receiving module 24 is configured to receive a CTS frame returned by the first STA 12, 13, or 14, and optionally, may also receive a data frame sent by the first STA 12, 13, or 14. It should be noted that, in the structure of the apparatus shown in FIG. 6, the receiving module 24 is not necessarily needed, because after the AP 11 successfully sends the RTS frame, a process of returning the CTS frame by the first STA is not necessarily needed. If the first STA sends the CTS frame, the AP subsequently sends the control frame, or if the first STA does not need to return the CTS frame, the AP may still subsequently send the control frame, which is not specifically limited in this embodiment.

In this embodiment, the AP 11 obtains the channel by means of contention by successfully sending an HEW RTS frame, where a TA in the HEW RTS frame is an address of the AP 11. The AP 11 sends the HEW RTS frame, and the first STAs 12, 13, and 14 receive the HEW RTS frame, can know, by using an RA and the TA in the HEW RTS frame, that the BSS 10 has successfully obtained the channel by means of contention and is about to enter a scheduling window, and continue to sense the channel to prepare to receive a control frame that is sent by the AP 11 and that is used to control data transmission. Optionally, after receiving the HEW RTS frame sent by the AP 11, the first STA 12, 13, or 14 may further return a CTS frame to the AP 11, to avoid a problem of hidden node. Multiple first STAs may simultaneously return a CTS frame, or the first STAs 12, 13, and 14 may sequentially return a CTS frame, which is not specifically limited herein. The second STA 20 receives the HEW RTS frame, parses the HEW RTS frame as an RTS frame of an IEEE 802.11 standard, can learn that the second STA 20 is not a target receive end, sets a NAV of the second STA 20 according to transmission duration in the HEW RTS frame, to enter a waiting mode, and contends for a channel again after the transmission duration of the BSS ends.

According to the apparatus in this embodiment, an AP obtains a channel by means of contention by successfully sending an HEW RTS frame, so that all first STAs in a BSS can enter a scheduling mode and transmit data by using the channel obtained by means of contention, and a second STA sets a NAV of the second STA to enter a waiting mode, thereby implementing compatibility between an HEW system and a system of an IEEE 802.11 standard, and improving a channel contention success rate of the BSS.

Further, based on the structure of the apparatus shown in FIG. 6, the contention module 22 of the AP 11 is further configured to: when the sensing module 21 senses that the channel is in an idle state, obtain the channel by means of contention by successfully sending a CTS frame. The CTS frame is used, so that the at least one first STAs 12, 13, and 14 learn, according to an RA in the CTS frame, that the BSS successfully obtains the channel by means of contention, and continue to sense the channel to receive a control frame that is sent by the AP 11 and that is used to control data transmission. The second STA 20 learns, according to the CTS frame, that the channel has been occupied and sets a network allocation vector NAV of the second STA according to transmission duration in the CTS frame. The scheduling module 23 is further configured to send the control frame, so that the first STA 12, 13, or 14 transmits data.

The AP 11 obtains the channel by means of contention by successfully sending an HEW CTS frame. The AP 11 sends the HEW CTS frame, and the first STAs 12, 13, and 14 receive the HEW CTS frame, can know, by using an RA in the HEW CTS frame, that the BSS 10 has successfully obtained the channel by means of contention and is about to enter a scheduling window, and continue to sense the channel to prepare to receive a control frame that is sent by the AP 11 and that is used to control data transmission. Optionally, after receiving the HEW CTS sent by the AP 11, the first STA 12, 13, or 14 may further return a CTS frame to the AP 11, to avoid a problem of hidden node. Multiple first STAs may simultaneously return a CTS frame, or the first STAs 12, 13, and 14 may sequentially return a CTS frame, which is not limited in the present disclosure. The second STA 20 receives the HEW CTS frame, parses the HEW CTS frame as a CTS frame of an IEEE 802.11 standard, can learn that the second STA 20 is not a target receive end, sets a NAV of the second STA 20 according to transmission duration in the HEW CTS frame, to enter a waiting mode, and contends for a channel again after the transmission duration of the BSS ends.

FIG. 7 is a schematic structural diagram of Embodiment 3 of a channel contention apparatus. Combining FIG. 5 and FIG. 7, the channel contention apparatus in this embodiment is any first STA in the BSS 10, for example, may be the first STA 12. The first STA 12 includes: a sensing module 31 and a contention module 32. The sensing module 31 is configured to sense a channel, and the contention module 32 is configured to: when the sensing module 31 senses that the channel is in an idle state, obtain the channel by means of contention by successfully sending an RTS frame, where a TA in the RTS frame is an address of the AP 11 or an address of the first STA 12 that successfully sends the RTS. The RTS frame is used, so that other first STAs 13 and 14 learn, according to an RA and the TA in the RTS frame, that the BSS 10 successfully obtains the channel by means of contention. The first STAs 12, 13, and 14 continue to sense the channel to receive a control frame that is sent by the AP 11 and that is used to control data transmission. The second STA 20 learns, according to the RTS frame, that the channel has been occupied and sets a network allocation vector NAV of the second STA 20 according to transmission duration in the RTS frame, and the AP 11 sends the control frame, so that the first STA 12, 13, or 14 transmits data.

In this embodiment, the first STA 12 obtains the channel by means of contention by successfully sending an HEW RTS frame, where a TA in the HEW RTS frame is an address of the AP 11 or an address of the first STA 12 that successfully sends the HEW RTS frame. The TA is set to the address of the AP 11 because all the first STAs 12, 13, and 14 in the BSS 10 know the address of the AP 11, and regardless of which first STA obtains the channel by means of contention, the AP 11 sends the control frame used to control data transmission. The first STA 12 sends the HEW RTS frame; the first STAs 13 and 14 receive the HEW RTS frame, and can know, by using an RA and the TA in the HEW RTS frame, that the BSS 10 has successfully obtained the channel by means of contention and is about to enter a scheduling window. All the first STAs 12, 13, and 14 in the BSS 10 continue to sense the channel to prepare to receive the control frame that is sent by the AP 11 and that is used to control data transmission; the second STA 20 receives the HEW RTS frame, parses the HEW RTS frame as an RTS frame of an IEEE 802.11 standard, can learn that the second STA 20 is not a target receive end, sets a NAV of the second STA 20 according to transmission duration in the HEW RTS frame, to enter a waiting mode, and contends for a channel again after the transmission duration of the BSS ends. The AP 11 receives the HEW RTS frame, can learn that the BSS successfully obtains the channel by means of contention, and sends the control frame used to control data transmission of the first STA.

According to the apparatus in this embodiment, a first STA obtains a channel by means of contention by successfully sending an HEW RTS frame, so that both a first STA and an AP in a BSS can enter a scheduling mode and transmit data by using the channel obtained by means of contention, and a second STA sets a NAV of the second STA to enter a waiting mode, thereby implementing compatibility between an HEW system and a system of an IEEE 802.11 standard, and improving a channel contention success rate of the BSS.

Further, based on the foregoing structure of the apparatus in FIG. 7, after the first STA 12 successfully sends an HEW RTS frame, the AP 11 may return a CTS frame after receiving the HEW RTS frame, because there may be a first STA, for example, the first STA 13, that cannot receive the HEW RTS frame sent by the first STA 12. Therefore, the AP 11 sends the CTS frame, so that all the first STAs in the BSS know that the BSS has successfully obtained the channel by means of contention and is about to enter a scheduling window. Other first STAs 13 and 14 can learn, according to the RA and the TA in the HEW RTS frame or according to an RA in the CTS frame returned by the AP 11, that the BSS successfully obtains the channel by means of contention. The first STAs 12, 13, and 14 continue to sense the channel to receive the control frame that is sent by the AP 11 and that is used to control data transmission. The second STA 20 learns, according to the HEW RTS frame or the CTS frame returned by the AP 11, that the channel has been occupied, and sets a network allocation vector NAV of the second STA 20 according to transmission duration in the HEW RTS frame or the CTS frame. The AP 11 sends the control frame, so that the first STA 12, 13, or 14 transmits data.

Further, based on the structure of the apparatus shown in FIG. 7, the contention module 32 of the first STA 12 is further configured to: when the sensing module 31 senses that the channel is in an idle state, obtain the channel by means of contention by successfully sending a CTS frame. The CTS frame is used, so that other first STAs 13 and 14 learn, according to the RA in the CTS frame, that the BSS successfully obtains the channel by means of contention. The first STAs 12, 13, and 14 continue to sense the channel to receive a control frame that is sent by the AP 11 and that is used to control data transmission. The second STA 20 learns, according to the CTS frame, that the channel has been occupied and sets a network allocation vector NAV of the second STA according to the transmission duration in the CTS frame, and the AP 11 sends the control frame, so that the first STA 12, 13, or 14 transmits data.

The first STA 12 obtains the channel by means of contention by successfully sending an HEW RTS frame. The first STA 12 sends the HEW RTS frame, and the first STAs 13 and 14 receive the HEW CTS frame, and can know, by using an RA in the HEW CTS frame, that the BSS 10 has successfully obtained the channel by means of contention and is about to enter a scheduling window. All the first STAs 12, 13, and 14 in the BSS 10 continue to sense the channel to prepare to receive the control frame that is sent by the AP 11 and that is used to control data transmission. The second STA 20 receives the HEW CTS frame, parses the HEW CTS frame as a CTS frame of an IEEE 802.11 standard, can learn that the second STA 20 is not a target receive end, sets a NAV of the second STA 20 according to transmission duration in the HEW CTS frame, to enter a waiting mode, and contends for a channel again after the transmission duration of the BSS ends. The AP 11 receives the HEW CTS frame, can learn that the BSS successfully obtains the channel by means of contention, and sends the control frame used to control data transmission of the first STA.

After the first STA 12 successfully sends an HEW CTS frame, after receiving the HEW CTS frame, the AP 11 may return a CTS frame used for feedback, because there may be a first STA, for example, the first STA 13, that cannot receive the HEW CTS frame sent by the first STA 12. Therefore, the AP 11 sends the CTS frame, so that all the first STAs in the BSS know that the BSS has successfully obtained the channel by means of contention and is about to enter a scheduling window. Other first STAs 13 and 14 can learn, according to the RA in the HEW CTS frame or according to an RA in the CTS frame that is returned by the AP 11 and that is used for feedback, that the BSS successfully obtains the channel by means of contention. The first STAs 12, 13, and 14 continue to sense the channel to receive the control frame that is sent by the AP 11 and that is used to control data transmission. The second STA 20 learns, according to the HEW CTS frame or the CTS frame that is returned by the AP 11 and that is used to feedback a user, that the channel has been occupied, and sets a network allocation vector NAV of the second STA 20 according to transmission duration in the HEW CTS frame or the CTS frame used for feedback. The AP 11 sends the control frame, so that the first STA 12, 13, or 14 transmits data.

Figure 8A:
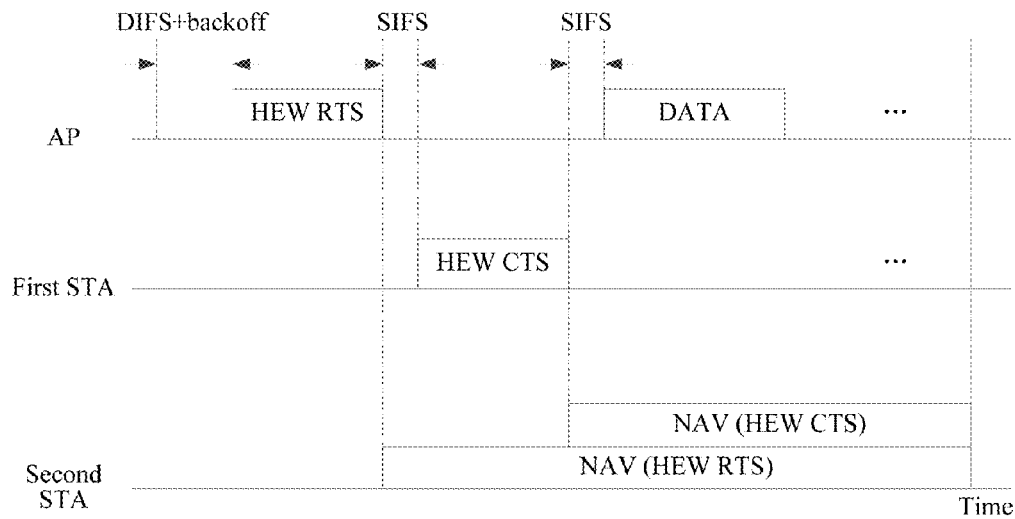
FIG. 8A is a schematic diagram 1 of a contention mechanism of a channel contention apparatus.
Figure 8B:
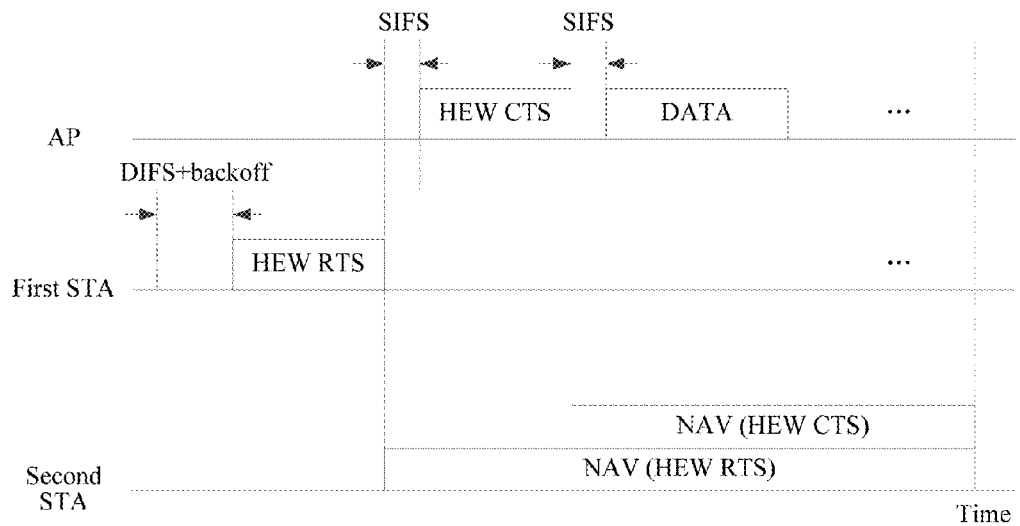
FIG. 8B is a schematic diagram 2 of a contention mechanism of a channel contention apparatus.
Figure 8C:
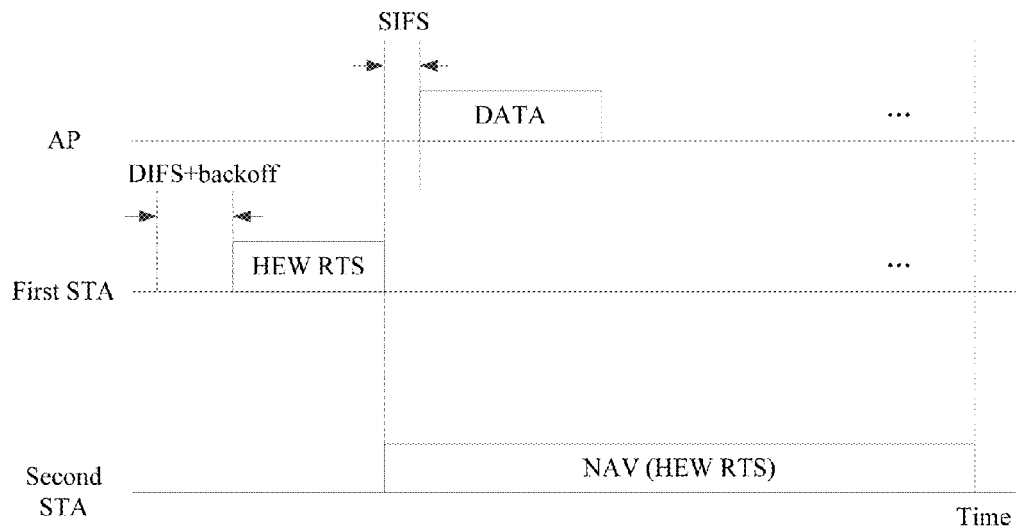
FIG. 8C is a schematic diagram 3 of a contention mechanism of a channel contention apparatus.
Figure 8D:
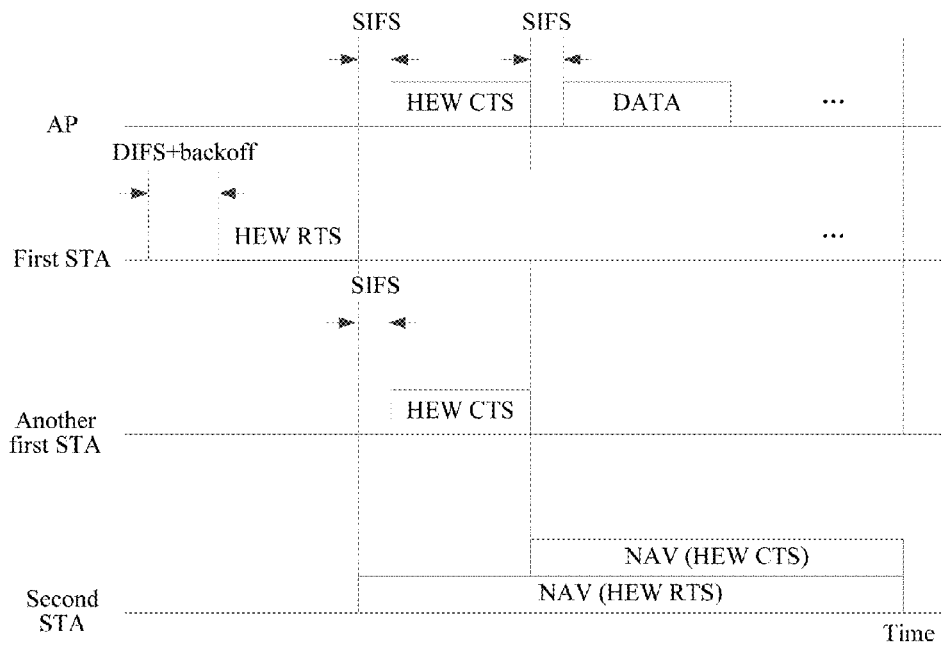
FIG. 8D is a schematic diagram 4 of a contention mechanism of a channel contention apparatus.
Figure 8E:
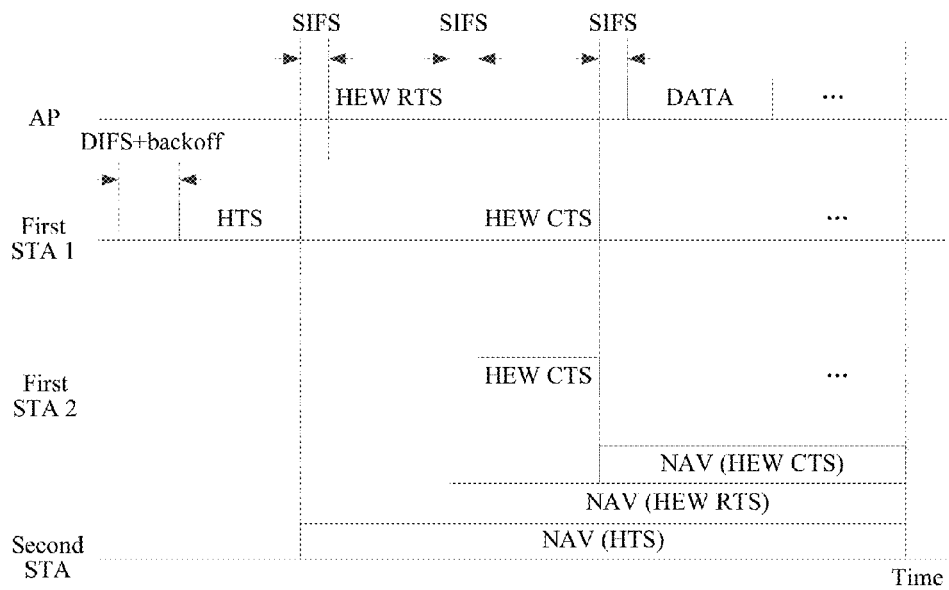
FIG. 8E is a schematic diagram 5 of a contention mechanism of a channel contention apparatus.
Figures 8F, 9:
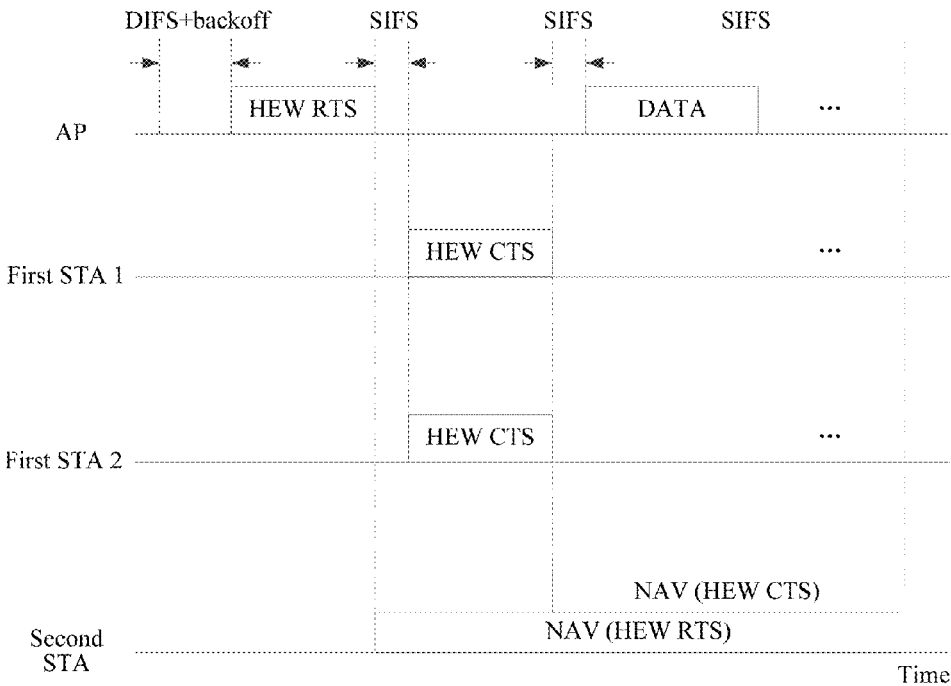
FIG. 8F is a schematic diagram 6 of a contention mechanism of a channel contention apparatus.
FIG. 9 is a flowchart of Embodiment 1 of a channel contention method.

FIG. 8A is a schematic diagram 1 of a contention mechanism of a channel contention apparatus, FIG. 8B is a schematic diagram 2 of a contention mechanism of a channel contention apparatus, FIG. 8C is a schematic diagram 3 of a contention mechanism of a channel contention apparatus, FIG. 8D is a schematic diagram 4 of a contention mechanism of a channel contention apparatus, FIG. 8E is a schematic diagram 5 of a contention mechanism of a channel contention apparatus, and FIG. 8F is a schematic diagram 6 of a contention mechanism of a channel contention apparatus. Interframe spaces (DIFS and SIFS) in FIG. 8A, FIG. 8B, FIG. 8C, FIG. 8D, FIG. 8E, and FIG. 8F and interframe spaces used in all the embodiments are duration stipulated in an IEEE 802.11 standard, but other lengths or units of interframe spaces are also applicable, which is not specifically limited herein.

As shown in FIG. 8A, an AP senses a channel, if sensing that the channel is in an idle state within duration of a DIFS, the AP performs a backoff process, and after backoff ends, the AP sends an HEW RTS frame if the channel is still idle. After a first STA receives the HEW RTS frame, the first STA returns an HEW CTS frame after duration of an SIFS. After a second STA receives the HEW RTS frame, the second STA learns that the channel is occupied, and sets a NAV of the second STA according to transmission duration in the HEW RTS frame, or the second STA sets or updates a NAV of the second STA according to transmission duration in the HEW CTS frame sent by the first STA. After the AP receives the HEW CTS frame, the AP starts to send data after duration of an SIFS, where the data may indicate control information, scheduling information, service data, or the like. In this embodiment, an AP in a BSS obtains the channel by means of contention by successfully sending an HEW RTS frame. As can be seen, a device that needs to send data is the AP. Therefore, the AP participates in channel contention, and successfully performs contention. After a first STA returns an HEW CTS frame, the AP starts to send data after an interval of a very short time.

As shown in FIG. 8B, a first STA senses a channel, if sensing that the channel is in an idle state within duration of a DIFS, the first STA performs a backoff process, and after backoff ends, the first STA sends an HEW RTS frame if the channel is still idle. After an AP receives the HEW RTS frame, the AP returns an HEW CTS frame after duration of an SIFS. After a second STA receives the HEW RTS frame, the second STA learns that the channel is occupied, and sets a NAV of the second STA according to transmission duration in the HEW RTS frame, or the second STA sets or updates a NAV of the second STA according to transmission duration in the HEW CTS frame sent by the AP. After the AP sends the HEW CTS frame, the AP starts to send data after duration of an SIFS, where the data may indicate control information, scheduling information, service data, or the like. In this embodiment, a first STA in a BSS obtains a channel by means of contention by successfully sending an HEW RTS frame. As can be seen, a device that needs to send data is the AP, but a first STA herein obtains the channel by means of contention herein, and after the first STA obtains the channel by means of contention, the AP uses the channel. It may be considered that the first STA "helps" the AP obtain the channel by means of contention, which is different from the prior art in which a device that needs to send data contends for a channel.

As shown in FIG. 8C, a first STA first senses a channel, if sensing that the channel is in an idle state within duration of a DIFS, the first STA performs a backoff process, and after backoff ends, the first STA sends an HEW RTS frame if the channel is still idle. After an AP receives the HEW RTS frame, the AP starts to send data after duration of an SIFS, where the data may indicate control information, scheduling information, service data, or the like. After a second STA receives the HEW RTS frame, the second STA learns that the channel is occupied, and sets a NAV of the second STA according to transmission duration in the HEW RTS frame. A difference between this embodiment and the embodiment shown in FIG. 8B lies in that after the AP receives the HEW RTS frame, the AP no longer returns the HEW CTS frame, but directly sends data after waiting for duration of one SIFS.

As shown in FIG. 8D, a first STA senses a channel, if sensing that the channel is in an idle state within duration of a DIFS, the first STA performs a backoff process, and after backoff ends, the first STA sends an HEW RTS frame if the channel is still idle. After an AP receives the HEW RTS frame, the AP returns an HEW CTS frame after duration of an SIFS, where an RA in the HEW CTS frame is identifier information that the AP and at least one first STA have agreed on in advance, and the identifier information is denoted by A. After another first STA receives the HEW RTS frame, the another first STA returns an HEW CTS frame after duration of an SIFS, where an RA in the HEW CTS frame is identifier information that all devices (including the AP and a STA) in the BSS have agreed on in advance, and the identifier information is denoted by B. After a second STA receives the HEW RTS frame, the second STA learns that the channel is occupied, and sets a NAV of the second STA according to transmission duration in the HEW RTS frame, or the second STA also sets or updates a NAV of the second STA according to transmission duration in the HEW CTS frame sent by the AP. After the AP sends the HEW CTS frame, the AP starts to send data after duration of an SIFS, where the data may indicate control information, scheduling information, service data, or the like. A difference between this embodiment and FIG. 8B lies in that after receiving the HEW RTS frame, another first STA in the BSS also returns an HEW CTS frame, to avoid a problem of hidden node. In addition, the identifier information A and the identifier information B may be different, to distinguish devices that send the HEW CTS frames.

As shown in FIG. 8E, a first STA 1 senses a channel, if sensing that the channel is in an idle state within duration of a DIFS, the first STA 1 performs a backoff process, and after backoff ends, the first STA sends a help-AP-to-send (HTS for short) frame if the channel is still idle, where the HTS frame is a new channel contention frame provided in the present disclosure, and is sent by a first STA in a BSS to help the AP preempt a channel. After the first STA successfully obtains the channel by means of contention, the first STA transfers permission to control the channel and permission to use the channel to the AP. It should be noted that, the HTS frame may also be referred to as another name, which falls within the protection scope of the present disclosure as long as a function and a structure thereof are consistent with the present disclosure, and a name of the frame is not specifically limited in the present disclosure. The frame structure shown in FIG. 3 or FIG. 4 may be used for a structure of the HTS frame. If the structure of the HTS frame is the same as a structure of an HEW RTS frame (as shown in FIG. 3), an RA in the HTS frame may be a value that the AP and the first STA have agreed on in advance, and is preferably a MAC address of the AP, and a TA in the HTS frame may also be a value that the AP and the first STA have agreed on in advance, and is preferably a MAC address of the first STA 1, the MAC address of the AP, a basic service set identifier (BSSID for short), or the like, If the structure of the HTS frame is the same as a structure of an HEW CTS frame (as shown in FIG. 4), an RA in the HTS frame may be a value that the AP and the first STA have agreed on in advance, and is preferably the MAC address of the AP. After the AP receives the HTS frame, the AP returns an HEW RTS frame after duration of an SIFS, where an RA in the HEW RTS frame may be a value that the AP and the first STA have agreed on in advance. For example, if the AP needs to send information to all first STAs, the RA may be set to a BSSID, and if the AP needs to send information to a group of first STAs, the RA may be set to a group number (group ID) of the group of first STAs, and a TA in the HEW RTS frame may be a value that the AP and the first STA have agreed on in advance, and is preferably the MAC address of the AP. After the first STA 1 and a first STA 2 receive the HEW RTS frame, the first STA 1 and the first STA 2 simultaneously return an HEW CTS frame after duration of an SIFS. After a second STA receives the HTS frame and/or the HEW RTS frame and/or the HEW CTS frame, the second STA can learn that the channel has been occupied, and sets or updates a NAV of the second STA according to a Duration value (that is, transmission duration) in the HTS frame and/or the HEW RTS frame and/or the HEW CTS frame. After the AP receives the HEW CTS frame sent by the first STA 1 and/or the first STA 2, the AP starts to send data after duration of an SIFS, where the data may indicate control information, scheduling information, service data, or the like. In this embodiment, a first STA 1 in the BSS obtains the channel by means of contention by successfully sending an HTS frame. As can be seen, a device that needs to send data is the AP, but a first STA 1 obtains the channel by means of contention herein, and after the first STA 1 obtains the channel by means of contention, the AP uses the channel. It may be considered that the first STA 1 "helps" the AP obtain the channel by means of contention, which is different from the prior art in which a device that needs to send data contends for a channel. In addition, the AP notifies, by sending an HEW RTS frame, all first STAs or some first STAs in the BSS that the channel has been preempted, and the first STA 1 and the first STA 2 returns an HEW CTS frame, to avoid a problem of hidden node.

As shown in FIG. 8F, an AP senses a channel, if sensing that the channel is in an idle state within duration of a DIFS, the AP performs a backoff process, and after backoff ends, the AP sends an HEW RTS frame if the channel is still idle. An RA in the HEW RTS frame may be a value that the AP and a first STA have agreed on in advance. For example, if the AP needs to send information to all first STAs, the RA may be set to a BSSID, and if the AP needs to send information to a group of first STAs, the RA may be set to a group number (group ID) of the group of first STAs, and a TA in the HEW RTS frame may be a value that the AP and the first STA have agreed on in advance, and is preferably a MAC address of the AP. After a first STA 1 and a first STA 2 receive the HEW RTS frame, the first STA 1 and the first STA 2 simultaneously return an HEW CTS frame after duration of an SIFS. After a second STA receives the HEW RTS frame and/or the HEW CTS frame, the second STA learns that the channel has been occupied, and sets or updates a NAV of the second STA according to transmission duration in the HEW RTS frame and/or the HEW CTS frame. After the AP receives the HEW CTS frame, the AP starts to send data after duration of an SIFS, where the data may indicate control information, scheduling information, service data, or the like.

It should be noted that, in the foregoing embodiments, the AP needs to send data, and regardless of whether the AP or the first STA obtains the channel by means of contention, the AP transmits data by using the channel. Similarly, if a first STA needs to send data, regardless of whether the AP or the first STA obtains the channel by means of contention, the first STA can still transmit data by using the channel, but a channel resource used by the first STA to send data is allocated by the AP herein, that is, the AP centrally controls and schedules the channel, and as long as the channel is obtained by means of contention, the AP can allocate, by sending the control frame, a resource to the first STA that needs to send data. In addition, the AP or the first STA may also obtain a channel by means of contention by sending an HEW CTS frame, which is not specifically limited herein.

FIG. 9 is a flowchart of Embodiment 1 of a channel contention method. As shown in FIG. 9, the method in this embodiment may include:

Step 101. A first device in a BSS senses a channel, where the BSS includes an access point AP and at least one first station STA, and the first device is the AP or any first STA.

In this embodiment, the BSS is a basic service set in a WLAN system to which a scheduling mode is introduced, the first device in the BSS senses the channel, and the first device may be any network device in the BSS, and can learn a usage status of the channel in time by sensing the channel.

Step 102. The first device contends for the channel, where the AP centrally performs control and scheduling so that all of at least one network device in the BSS can transmit data by using the channel, and both the AP and the at least one first STA participate in channel contention.

In this embodiment, the first device in the BSS obtains the channel by means of contention, all network devices in the BSS can transmit data by using the channel obtained by means of contention. The BSS is a basic service set in an HEW system, and may include the AP and one or more first STAs. The first STA is a station of an HEW standard, and can support technologies such as OFDMA and scheduling, the first device herein may be the AP, or may be the first STA, and all the network devices in the BSS participate in channel contention, that is, sense the channel. Channel contention network devices further include a second STA in addition to the entire BSS. The second STA does not belong to the BSS, and may be any STA in IEEE 802.11 series of standards. The second STA interferes with the first STA. Therefore, after the BSS successfully obtains a channel by means of contention, the second STA enters a waiting mode, and starts to contend for a channel after a scheduling mode of the BSS ends, which avoids interference to the first STA. After obtaining the channel by means of contention, the AP or the first STA in the BSS transfers permission to control the channel to the AP, and the AP centrally controls and schedules the channel, and allocates permission to use the channel to the first STA. Therefore, after any device in the BSS obtains the channel by means of contention, it indicates successful channel contention, and all the network devices in the BSS can transmit data by using the channel.

In this embodiment, all network devices, including an AP and a STA, in a BSS participate in channel contention, and after any device senses a channel and obtains the channel by means of contention, the AP can centrally control and schedule these network devices, so that all the network devices in the BSS can transmit data in a subsequent period of time by using the channel obtained by means of contention, and do not need to perform contention again, thereby improving a channel contention success rate and data transmission efficiency of a network device in the BSS.

Further, in step 102 in the foregoing method embodiment, the first device contends for the channel, and a specific implementation method may be: sensing, by the first device, that the channel is in an idle state, and obtaining the channel by means of contention by successfully sending a channel contention frame. In this embodiment, when contending for the channel, the network device in the BSS may obtain the channel by means of contention by successfully sending the channel contention frame. When multiple network devices simultaneously contend for the channel, the multiple network devices may send the channel contention frame when sensing that the channel is idle, and a device that can successfully send the channel contention frame is a device that successfully obtains the channel by means of contention.

Preferably, the channel contention frame may be an RTS frame, and the RTS frame includes transmission duration, an RA, and a TA. To maintain consistent with an existing RTS frame in format, the RTS frame in this embodiment may further include frame control information and FCS information, where the transmission duration is scheduling duration needed by the network device in the BSS, and the RA is identifier information that the AP and the at least one first STA have agreed on in advance. Optionally, the transmission duration may also be maximum duration that is allowed to be set, and in the present disclosure, the maximum duration that is allowed to be set may be limited in two manners. In one manner, maximum limited transmission duration has been agreed on in advance within a local regional range, and in the other manner, a maximum value may be set according to a quantity of bits occupied by the transmission duration. A format of an RTS frame is shown in FIG. 3, and the RTS frame in this embodiment may be a frame specially used for an HEW system, and has 20 bytes in total, where the control information has two bytes, the transmission duration has two bytes, the RA has six bytes, the TA has six bytes, and the FCS information has four bytes. A format of an HEW RTS frame is completely consistent with a format of an RTS frame in an IEEE 802.11 standard, so that all STAs, including the first STA and the second STA, can receive and demodulate the RTS frame. Each HEW RTS frame occupies a bandwidth of 20 MHz, there are 64 subcarriers at the bandwidth of 20 MHz, and a quantity and locations of pilot subcarriers are also the same as those of the RTS frame in the IEEE 802.11 standard. If there is a bandwidth of 80 MHz, an HEW RTS frame is separately sent at each bandwidth of 20 MHz. A difference from the RTS frame in the IEEE 802.11 standard lies in that, in the HEW RTS frame, the transmission duration is scheduling duration needed by the BSS, that is, total duration needed by the AP and the first STA that belong to the BSS to transmit data after the BSS successfully obtains a channel by means of contention. The second STA sets a NAV according to the transmission duration, to determine duration that needs to be waited for, and the first STA determines a size of a scheduling window by using the transmission duration. The RA is the identifier information that the AP and the first STA have agreed on in advance, and all first STAs in the BSS can acquire the identifier information, so that after the first STA demodulates the RTS frame to obtain the identifier information, the first STA knows that the RTS frame is an HEW RTS frame, and learns that the BSS has obtained the channel by means of contention and is about to enter the scheduling window. The RA may be set to any identifier information except a MAC address of the second STA, to avoid that the second STA incorrectly considers that the RTS frame is sent to the second STA. For example, the RA may be a MAC address of the AP, identifier information of the BSS, or a group number of the first STA.

Optionally, the channel contention frame may be a CTS frame, and the CTS frame includes transmission duration and an RA. To maintain consistent with an existing CTS frame in format, the CTS frame in this embodiment may further include frame control information and FCS information, where the transmission duration is scheduling duration needed by the network device in the BSS, and the RA is identifier information that the AP and the at least one first STA have agreed on in advance. Optionally, the transmission duration may also be maximum duration that is allowed to be set, and in the present disclosure, the maximum duration that is allowed to be set may be limited in two manners. In one manner, maximum limited transmission duration has been agreed on in advance within a local regional range, and in the other manner, a maximum value may be set according to a quantity of bits occupied by the transmission duration. A format of a CTS frame is shown in FIG. 4, and the CTS frame in this embodiment may be a frame specially used for an HEW system, and has 14 bytes in total, where the control information has two bytes, the transmission duration has two bytes, the RA has six bytes, and the FCS information has four bytes. A format of an HEW CTS frame is completely consistent with a format of a CTS frame in an IEEE 802.11 standard, so that all STAs, including the first STA and the second STA, can receive and demodulate the CTS frame. A difference from the CTS frame in the IEEE 802.11 standard lies in that, in the HEW CTS frame, the transmission duration is scheduling duration needed by the BSS, that is, total duration needed by the AP and the first STA that belong to the BSS to transmit data after the BSS successfully obtains a channel by means of contention. The second STA sets a NAV according to the transmission duration, to determine duration that needs to be waited for, and the first STA determines a size of a scheduling window by using the transmission duration. The RA is the identifier information that the AP and the first STA have agreed on in advance, and all first STAs in the BSS can acquire the identifier information, so that after the first STA demodulates the CTS frame to obtain the identifier information, the first STA knows that the CTS frame is an HEW CTS frame, and learns that the BSS has obtained the channel by means of contention and is about to enter the scheduling window. The RA cannot be set to the MAC address of the second STA, to avoid that the second STA incorrectly considers that the CTS frame is sent to the second STA, and the RA cannot be set to a MAC address of the AP either, so that an HEW CTS frame is distinguished from a CTS frame sent by the second STA to the AP.

In this embodiment, an HEW RTS frame and an HEW CTS frame whose formats are the same as a format in an IEEE 802.11 standard are set, so that an HEW system is compatible with another IEEE 802.11 standard, which is easy to achieve. Different content is set for a same field so that the first station and the second station can clearly perform demodulation and learn a next action, which resolves a problem of compatibility between the existing RTS/CTS mechanism and a WLAN system to which a scheduling mode is introduced.

The following describes in detail the technical solution in the method embodiment shown in FIG. 8 by using specific embodiments.

An application scenario in the following embodiment is shown in FIG. 5.

Figure 10:
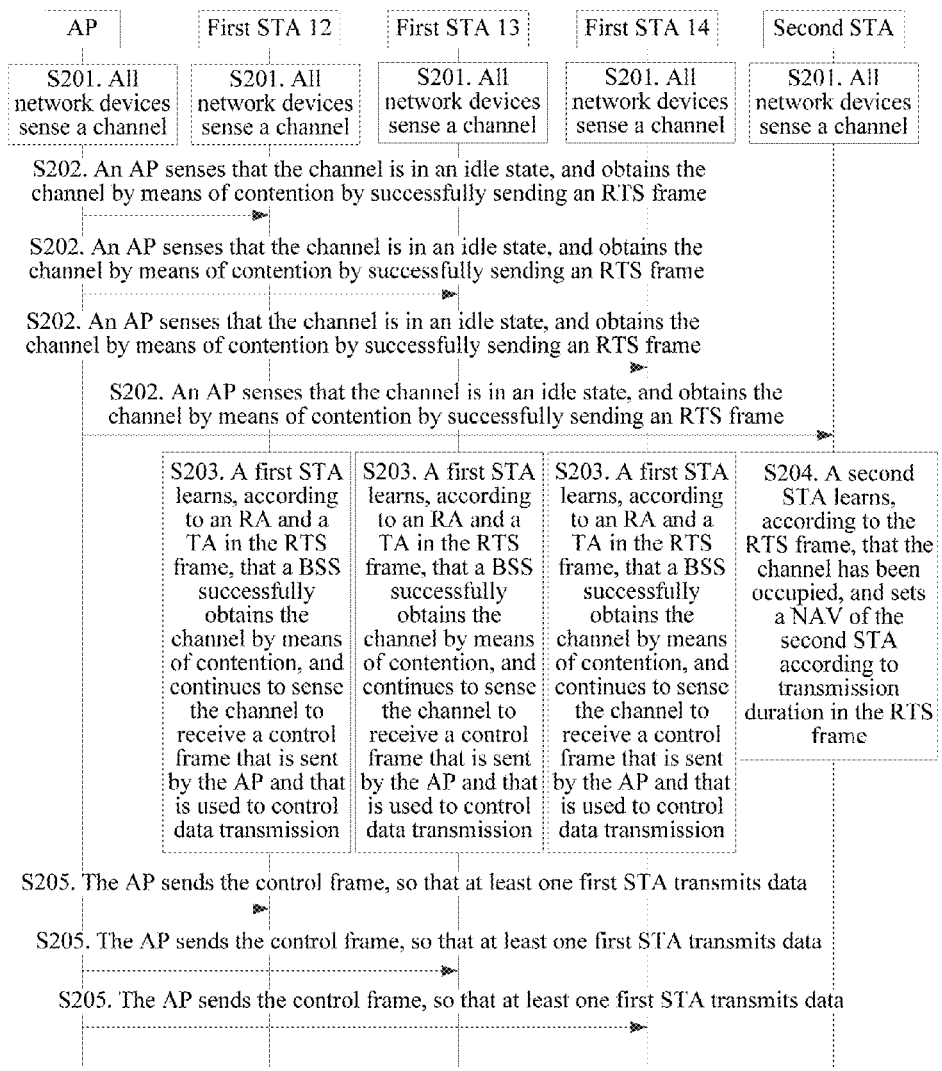
FIG. 10 is a flowchart of Embodiment 2 of a channel contention method.

FIG. 10 is a flowchart of Embodiment 2 of a channel contention method. As shown in FIG. 10, in this embodiment, an AP in a BSS obtains a channel by means of contention, and the method in this embodiment may include:

S201. All network devices sense a channel.

In this embodiment, all the network devices sense the channel, and all the network devices include an AP and a first STA that belong to a same BSS, and further include a second STA.

S202. An AP senses that the channel is in an idle state, and obtains the channel by means of contention by successfully sending an RTS frame.

In this embodiment, the AP in the BSS senses that the channel is in an idle state, and obtains the channel by means of contention by successfully sending an RTS frame, where a TA in the RTS frame is an address of the AP, and the RTS frame may be a frame specially used for an HEW system. After the AP successfully sends the RTS frame, the BSS to which the AP belongs can transmit data by using the channel obtained by means of contention.

S203. A first STA learns, according to an RA and a TA in the RTS frame, that a BSS successfully obtains the channel by means of contention, and continues to sense the channel to receive a control frame that is sent by the AP and that is used to control data transmission.

In this embodiment, after the channel is successfully obtained by means of contention, three first STAs that belong to the BSS receive the HEW RTS frame, can know, by using the RA and the TA in the HEW RTS frame, that the BSS has successfully obtained the channel by means of contention and is about to enter a scheduling window, and continue to sense the channel to prepare to receive the control frame that is sent by the AP and that is used to control data transmission.

Optionally, after receiving the HEW RTS sent by the AP, the first STAs may further return a CTS frame to the AP, to avoid a problem of hidden node. The three first STAs may simultaneously return a CTS frame, or the three first STAs may sequentially return a CTS frame, which is not specifically limited herein.

S204. A second STA learns, according to the RTS frame, that the channel has been occupied, and sets a NAV of the second STA according to transmission duration in the RTS frame.

In this embodiment, the second STA receives the HEW RTS frame, parses the HEW RTS frame as an RTS frame of an IEEE 802.11 standard, can learn that the channel has been occupied and the second STA is not a target receive end, sets a NAV of the second STA according to the transmission duration in the HEW RTS frame, to enter a waiting mode, and contends for a channel again after the transmission duration of the BSS ends.

S205. The AP sends the control frame, so that at least one first STA transmits data.

In this embodiment, the AP sends the control frame to the first STA, so that the at least one first STA transmits data, and the control frame may be sent only to a first STA that needs to be scheduled, or may be sent to all first STAs, which is not specifically limited herein.

In this embodiment, an AP obtains a channel by means of contention by successfully sending an HEW RTS frame, so that all first STAs in a BSS can enter a scheduling mode and transmit data by using the channel obtained by means of contention, and a second STA sets a NAV of the second STA to enter a waiting mode, thereby implementing compatibility between an HEW system and a system of an IEEE 802.11 standard, and improving a channel contention success rate of the BSS.

Further, in the foregoing method embodiment, the AP obtains the channel by means of contention by successfully sending an HEW RTS frame. Optionally, the AP may further obtain the channel by means of contention by successfully sending an HEW CTS frame. A first STA learns, according to an RA in the HEW CTS frame, that the BSS successfully obtains the channel by means of contention, and continues to sense the channel to receive a control frame that is sent by the AP and that is used to control data transmission. The second STA learns, according to the HEW CTS frame, that the channel has been occupied, and sets the NAV of the second STA according to transmission duration in the HEW CTS frame. The AP sends the control frame, so that at least one first STA transmits data.

Figure 11:
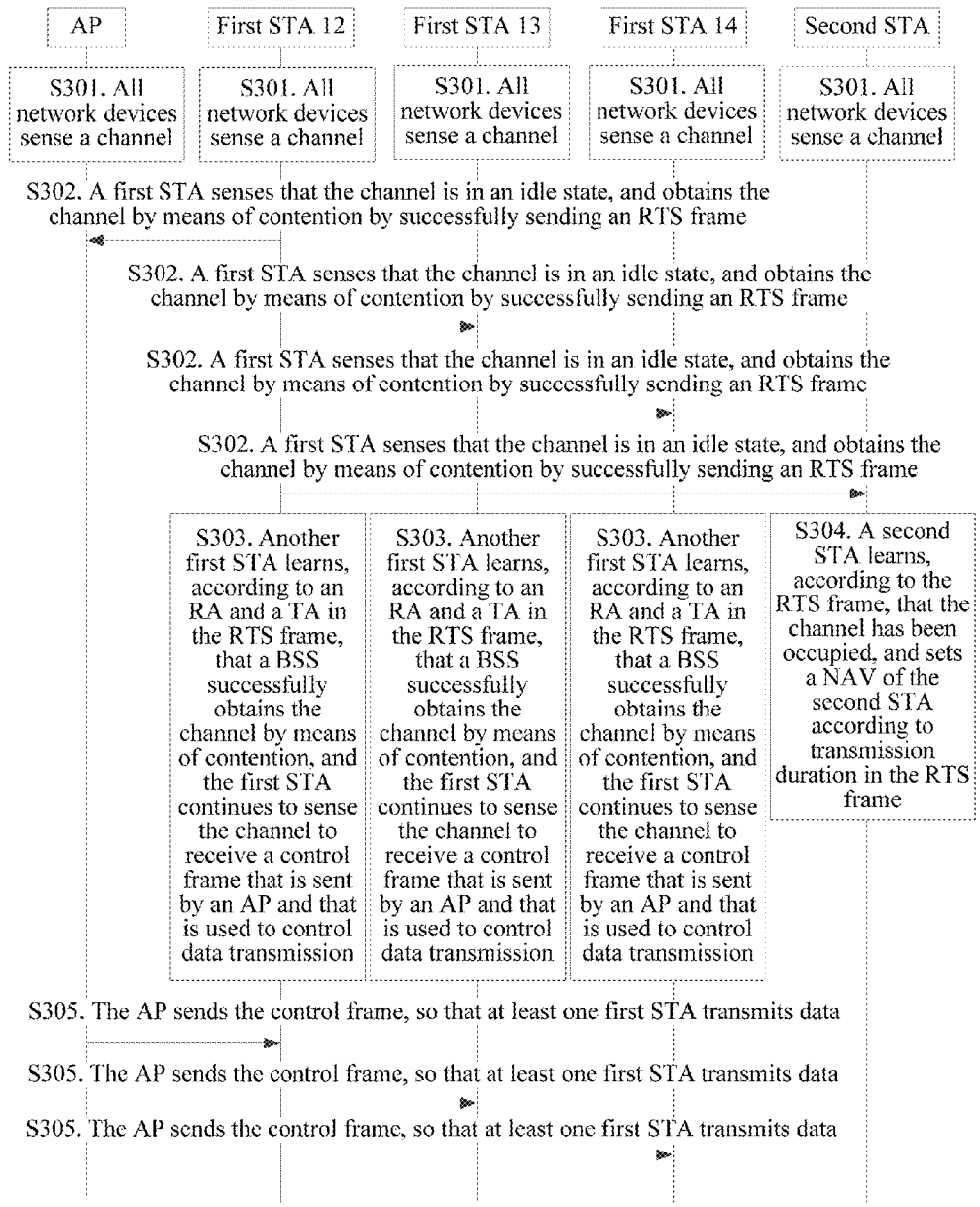
FIG. 11 is a flowchart of Embodiment 3 of a channel contention method.

FIG. 11 is a flowchart of Embodiment 3 of a channel contention method. As shown in FIG. 11, in this embodiment, any first STA in a BSS may be, for example, a first STA 12, and the method in the embodiment may include:

S301. All network devices sense a channel.

In this embodiment, a process in which all the network devices sense the channel is similar to step S201 in the foregoing method embodiment, and details are not described herein.

S302. A first STA senses that the channel is in an idle state, and obtains the channel by means of contention by successfully sending an RTS frame.

In this embodiment, any first STA, for example, a first STA 12 in the BSS senses that the channel is in an idle state, and obtains the channel by means of contention by successfully sending an RTS frame, where a TA in the RTS frame is an address of the AP or an address of the first STA 12 that successfully sends the RTS, and the RTS frame may be a frame specially used for an HEW system. After the first STA 12 successfully sends the RTS frame, the BSS to which the first STA 12 belongs can transmit data by using the channel obtained by means of contention.

S303. Another first STA learns, according to an RA and a TA in the RTS frame, that a BSS successfully obtains the channel by means of contention, and the first STA continues to sense the channel to receive a control frame that is sent by an AP and that is used to control data transmission.

In this embodiment, other first STAs in the BSS, that is, first STAs 13 and 14, receive the HEW RTS frame, can know, by using the RA and the TA in the HEW RTS frame, that the BSS has successfully obtained the channel by means of contention and is about to enter a scheduling window, and continue to sense the channel to prepare to receive the control frame that is sent by the AP and that is used to control data transmission.

S304. A second STA learns, according to the RTS frame, that the channel has been occupied, and sets a NAV of the second STA according to transmission duration in the RTS frame.

In this embodiment, a process in which the second STA learns, according to the RTS frame, that the channel has been occupied, and sets the NAV of the second STA according to the transmission duration in the RTS frame is similar to step S204 in the foregoing method embodiment, and details are not described herein again.

S305. The AP sends the control frame, so that at least one first STA transmits data.

In this embodiment, a process in which the AP sends the control frame, so that the at least one first STA transmits data is similar to step S205 in the foregoing method embodiment, and details are not described herein again.

In this embodiment, a first STA obtains a channel by means of contention by successfully sending an HEW RTS frame, so that both a first STA and an AP in a BSS can enter a scheduling mode and transmit data by using the channel obtained by means of contention, and a second STA sets a NAV of the second STA to enter a waiting mode, thereby implementing compatibility between an HEW system and a system of an IEEE 802.11 standard, and improving a channel contention success rate of a BSS.

Further, before step S303 in the foregoing method embodiment, the method may further include: returning, by the AP, a CTS frame according to the HEW RTS frame sent by the first STA, because there may be a first STA, for example, the first STA 13, that cannot receive the HEW RTS frame sent by the first STA 12. Therefore, the AP sends a CTS frame, so that all the first STAs in the BSS know that the BSS has successfully obtained the channel by means of contention and is about to enter a scheduling window.

Further, in the foregoing method embodiment, the first STA obtains the channel by means of contention by successfully sending an HEW RTS frame. Optionally, the first STA may further obtain the channel by means of contention by successfully sending an HEW CTS frame. Another first STA learns, according to an RA in the HEW CTS frame, that the BSS successfully obtains the channel by means of contention, and the first STA in the BSS continues to sense the channel to receive a control frame that is sent by the AP and that is used to control data transmission. The second STA learns, according to the HEW CTS frame, that the channel has been occupied, and sets a NAV of the second STA according to transmission duration in the HEW CTS frame. The AP sends the control frame, so that the at least one first STA transmits data.

Further, in S302, the first STA senses that the channel is in an idle state, and may further obtain the channel by means of contention by successfully sending an HTS frame. The frame structure shown in FIG. 3 or FIG. 4 may be used for a structure of the HTS frame. If the structure of the HTS frame is the same as a structure of an HEW RTS frame (as shown in FIG. 3), an RA in the HTS frame may be a value that the AP and the first STA have agreed on in advance, and is preferably a MAC address of the AP, and a TA in the HTS frame may also be a value that the AP and the first STA have agreed on in advance, and is preferably a MAC address of the first STA 1, the MAC address of the AP, a basic service set identifier (BSSID for short), or the like. If the structure of the HTS frame is the same as a structure of an HEW CTS frame (as shown in FIG. 4), the RA in the HTS frame may be a value that the AP and the first STA have agreed on in advance, and is preferably the MAC address of the AP. After the AP receives the HTS frame, the AP may send an HEW RTS frame, where an RA in the HEW RTS frame may be a value that the AP and the first STA have agreed on in advance. For example, if the AP needs to send information to all first STAs, the RA may be set to a BSSID, and if the AP needs to send information to a group of first STAs, the RA may be set to a group number (group ID) of the group of first STAs, and a TA in the HEW RTS frame may be a value that the AP and the first STA have agreed on in advance, and is preferably the MAC address of the AP. After receiving the HEW RTS frame, all the first STAs in the BSS simultaneously return an HEW CTS frame, where an RA in the HEW CTS frame is a value that the AP and the first STAs have agreed on in advance, and is preferably the MAC address of the AP, to avoid a problem of hidden node.

The structures of the channel contention apparatuses shown in FIG. 2, FIG. 6, and FIG. 7 include multiple modules, and during implementation of a device entity, functions of these modules may be separately implemented by a transmitter, a processor, and a receiver. The following describes structures of channel contention devices according to the structures of the channel contention apparatuses by using embodiments.

Figure 12:
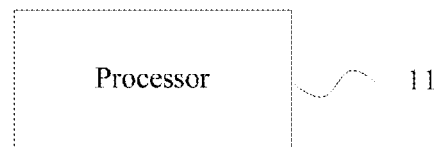
FIG. 12 is a schematic structural diagram of Embodiment 1 of a channel contention device.

FIG. 12 is a schematic structural diagram of Embodiment 1 of a channel contention device. As shown in FIG. 12, the device in this embodiment belongs to a BSS, the BSS includes an access point AP and at least one first station STA, both the AP and the at least one first STA participate in channel contention, and the device is the AP or any first STA. The device includes a processor 11, where the processor 11 is configured to sense a channel, and contend for the channel, where the AP centrally performs control and scheduling so that all of at least one network device in the BSS can transmit data by using the channel.

In this embodiment, the channel contention device belongs to the basic service set BSS. The BSS is a basic service set in a WLAN system to which a scheduling mode is introduced, and includes the access point AP and the at least one first station STA. Both the AP and the at least one first STA participate in channel contention, and the first STA is a station of an HEW standard and can support technologies such as OFDMA and scheduling. When either the AP or the first STA obtains a channel by means of contention, the entire BSS can transmit data by using the channel. Channel contention network devices further include a second STA in addition to the entire BSS. The second STA does not belong to the BSS, and may be any STA in IEEE 802.11 series of standards. The second STA interferes with the first STA. Therefore, after the BSS successfully obtains a channel by means of contention, the second STA enters a waiting mode, and starts to contend for a channel after a scheduling mode of the BSS ends, which avoids interference to the first STA. The device in this embodiment may be the AP in the BSS, or may be any first STA in the BSS. The processor 11 of the channel contention device needs to sense the channel before the device obtains the channel by means of contention, to determine a status of the channel. After the processor 11 obtains the channel by means of contention, all the network devices in the BSS can transmit data by using the channel.

As any network device in the BSS, the device in this embodiment senses a channel and obtains the channel by means of contention, and then the AP centrally controls and schedules the network devices in the BSS, so that all the network devices in the BSS can transmit data in a subsequent period of time by using the channel obtained by means of contention, and do not need to perform contention again, thereby improving a channel contention success rate and data transmission efficiency of a network device in the BSS.

Figure 13:
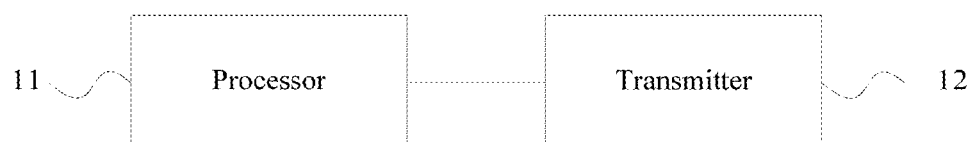
FIG. 13 is a schematic structural diagram of Embodiment 2 of a channel contention device.

FIG. 13 is a schematic structural diagram of Embodiment 2 of a channel contention device. As shown in FIG. 13, based on the structure of the device shown in FIG. 12, further, the device in this embodiment further includes a transmitter 12, configured to: after the processor senses that the channel is in an idle state, successfully send a channel contention frame so that the device obtains the channel by means of contention.

Preferably, the transmitter 12 may obtain the channel by means of contention by successfully sending an RTS frame, where the RTS frame includes transmission duration, an RA, and a TA. To maintain consistent with an existing RTS frame in format, the RTS frame in this embodiment may further include frame control information and FCS information, where the transmission duration is scheduling duration needed by the BSS, and the RA is identifier information that the AP and the at least one first STA have agreed on in advance. FIG. 3 is a schematic diagram of a format of an RTS frame. As shown in FIG. 3, the RTS frame in this embodiment may be a frame specially used for an HEW system, and has 20 bytes in total, where the control information has two bytes, the transmission duration has two bytes, the RA has six bytes, the TA has six bytes, and the FCS information has four bytes. A format of an HEW RTS frame is completely consistent with a format of an RTS frame in an IEEE 802.11 standard, so that all STAs, including the first STA and the second STA, can receive and demodulate the RTS frame. Each HEW RTS frame occupies a bandwidth of 20 MHz, there are 64 subcarriers at the bandwidth of 20 MHz, and a quantity and locations of pilot subcarriers are also the same as those of the RTS frame in the IEEE 802.11 standard. If there is a bandwidth of 80 MHz, an HEW RTS frame is separately sent at each bandwidth of 20 MHz. A difference from the RTS frame in the IEEE 802.11 standard lies in that, in the HEW RTS frame, the transmission duration is scheduling duration needed by the BSS, that is, total duration needed by the AP and the first STA that belong to the BSS to transmit data after the BSS successfully obtains a channel by means of contention. The second STA sets a NAV according to the transmission duration, to determine duration that needs to be waited for, and the first STA determines a size of a scheduling window by using the transmission duration. The RA is the identifier information that the AP and the first STA have agreed on in advance, and all first STAs in the BSS know the identifier information in advance, so that after the first STA demodulates the RTS frame to obtain the identifier information, the first STA knows that the RTS frame is an HEW RTS frame, and learns that the BSS has obtained the channel by means of contention and is about to enter the scheduling window. The RA may be set to any identifier information except a MAC address of the second STA, to avoid that the second STA incorrectly considers that the RTS frame is sent to the second STA. For example, the RA may be a MAC address of the AP, identifier information of the BSS, or a group number of the first STA.

Optionally, the transmitter 12 may further obtain the channel by means of contention by successfully sending a CTS frame, where the CTS frame includes transmission duration and an RA. To maintain consistent with an existing CTS frame in format, the CTS frame in this embodiment may further include frame control information and FCS information, where the transmission duration is scheduling duration needed by the BSS, and the RA is identifier information that the AP and the at least one first STA have agreed on in advance. FIG. 4 is a schematic diagram of a format of a CTS frame. As shown in FIG. 4, the CTS frame in this embodiment may be a frame specially used for an HEW system, and has 14 bytes in total, where the control information has two bytes, the transmission duration has two bytes, the RA has six bytes, and the FCS information has four bytes. A format of an HEW CTS frame is completely consistent with a format of a CTS frame in an IEEE 802.11 standard, so that all STAs, including the first STA and the second STA, can receive and demodulate the CTS frame. A difference from the CTS frame in the IEEE 802.11 standard lies in that, in the HEW CTS frame, the transmission duration is scheduling duration needed by the BSS, that is, total duration needed by the AP and the first STA that belong to the BSS to transmit data after the BSS successfully obtains a channel by means of contention. The second STA sets a NAV according to the transmission duration, to determine duration that needs to be waited for, and the first STA determines a size of a scheduling window by using the transmission duration. The RA is the identifier information that the AP and the first STA have agreed on in advance, and all first STAs in the BSS can acquire the identifier information, so that after the first STA demodulates the CTS frame to obtain the identifier information, the first STA knows that the CTS frame is an HEW CTS frame, and learns that the BSS has obtained the channel by means of contention and is about to enter the scheduling window. The RA cannot be set to the MAC address of the second STA, to avoid that the second STA incorrectly considers that the CTS frame is sent to the second STA, and the RA cannot be set to a MAC address of the AP either, so that an HEW CTS frame is distinguished from a CTS frame sent by the second STA to the AP.

In this embodiment, an HEW RTS frame and an HEW CTS frame whose formats are the same as a format in an IEEE 802.11 standard are set, so that an HEW system is compatible with another IEEE 802.11 standard, which is easy to achieve. Different content is set for a same field so that the first station and the second station can clearly perform demodulation and learn a next action, which resolves a problem of compatibility between the existing RTS/CTS mechanism and a WLAN to which a scheduling mode is introduced.

Figure 14:
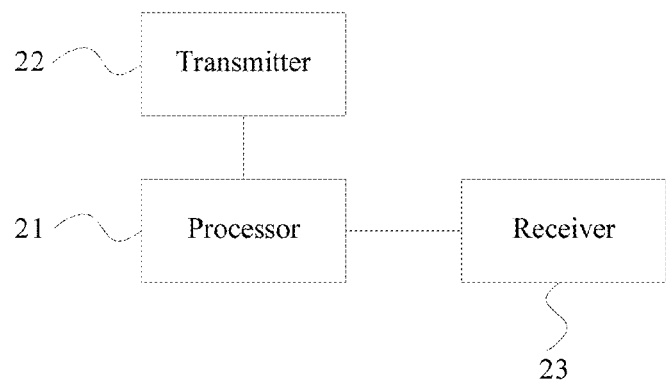
FIG. 14 is a schematic structural diagram of Embodiment 3 of a channel contention device.

FIG. 14 is a schematic structural diagram of Embodiment 3 of a channel contention device. As shown in FIG. 14, the channel contention device is an AP, and the AP includes: a processor 21, a transmitter 22, and a receiver 23. The processor 21 is configured to sense a channel. The transmitter 22 is configured to: after the processor 21 of the AP senses that the channel is in an idle state, successfully send an RTS frame so that the AP obtains the channel by means of contention, where a TA in the RTS frame is an address of the AP, and the RTS frame is used, so that at least one first STA learns, according to an RA and the TA in the RTS frame, that a BSS successfully obtains the channel by means of contention, and continues to sense the channel to receive a control frame that is sent by the AP and that is used to control data transmission, and a second STA learns, according to the RTS frame, that the channel has been occupied, and sets a network allocation vector NAV of the second STA according to transmission duration in the RTS frame; and send the control frame, so that the at least one first STA transmits data. The receiver 23 is configured to receive a CTS frame returned by the at least one first STA.

The device in this embodiment may be used to execute the technical solutions in the method embodiments shown in FIG. 9 to FIG. 11, and details are not described herein again.

Further, the transmitter 22 may further be configured to obtain the channel by means of contention by successfully sending a CTS frame, where the CTS frame is used, so that the at least one first STA learns, according to an RA in the CTS frame, that the BSS successfully obtains the channel by means of contention, and continues to sense the channel to receive a control frame that is sent by the AP and that is used to control data transmission, and the second STA learns, according to the CTS frame, that the channel has been occupied, and sets a network allocation vector NAV of the second STA according to transmission duration in the CTS frame; and send the control frame, so that the at least one first STA transmits data.

Figure 15:
FIG. 15 is a schematic structural diagram of Embodiment 4 of a channel contention device.

FIG. 15 is a schematic structural diagram of Embodiment 4 of a channel contention device. As shown in FIG. 15, the channel contention device is any first STA in a BSS, and the first STA includes: a processor 31 and a transmitter 32. The processor 31 is configured to sense a channel. The transmitter 32 is configured to: after the processor of the first STA senses that the channel is in an idle state, successfully send an RTS frame so that the first STA obtains the channel by means of contention. A TA in the RTS frame is an address of the AP or an address of the first STA that successfully sends the RTS. The RTS frame is used, so that another first STA learns, according to an RA and the TA in the RTS frame, that the BSS successfully obtains the channel by means of contention, at least one first STA in the BSS continues to sense the channel to receive a control frame that is sent by the AP and that is used to control data transmission, where the another first STA is a first STA, in the BSS, except the first STA that successfully sends the RTS frame, a second STA learns, according to the RTS frame, that the channel has been occupied, and sets a network allocation vector NAV of the second STA according to transmission duration in the RTS frame, and the AP sends the control frame, so that the at least one first STA transmits data.

The device in this embodiment may be used to execute the technical solutions in the method embodiments shown in FIG. 9 to FIG. 11, and details are not described herein again.

Further, the transmitter 32 may further be configured to obtain the channel by means of contention by successfully sending a CTS frame, where the CTS frame is used, so that another first STA learns, according to an RA in the CTS frame, that the BSS successfully obtains the channel by means of contention, at least one first STA continues to sense the channel to receive a control frame that is sent by the AP and that is used to control data transmission, where the another first STA is a first STA, in the BSS, except the first STA that successfully sends the CTS frame, the second STA learns, according to the CTS frame, that the channel has been occupied, and sets a network allocation vector NAV of the second STA according to transmission duration in the CTS frame, and the AP sends the control frame, so that the at least one first STA transmits data.

Optionally, after the first STA successfully sends an RTS frame or a CTS frame, the AP in the BSS may return a CTS frame to ensure that all first STAs in the BSS learn that the channel has been successfully obtained by means of contention.

In the several embodiments provided in the present disclosure, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform a part of the steps of the methods described in the embodiments. The foregoing storage medium includes: any medium that can store program code, such as a USB flash drive, a removable hard disk, a read-only memory (ROM), a random access memory (RAM), a magnetic disk, or an optical disc.

It may be clearly understood by persons skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments.

What is claimed is:

1. A station (STA), comprising:
   a processor; and
   a non-transitory computer-readable storage medium storing a program to be executed by the processor, the program including instructions for:
   sensing that a channel is in an idle state;
   in response to sensing that the channel is in the idle state, obtaining the channel by contention by sending a channel contention frame; and
   transferring permission to control the channel to an access point (AP) in a basic service set (BSS), and causing the channel to be centrally controlled and scheduled by the AP in the BSS, wherein the BSS comprises the AP and at least one STA, and wherein the at least one STA comprises the STA.

2. The STA according to claim 1, wherein the program includes further instructions for:
   receiving a scheduling frame sent by the AP, wherein the scheduling frame is a control frame or a data frame; and
   transmitting data on the channel according to the scheduling frame.

3. The STA according to claim 1, wherein the channel contention frame comprises a transmission duration and a receiver address (RA), wherein the transmission duration is a scheduling duration for at least one of the AP or the STA in the BSS, or a maximum duration allowed to be set, and wherein the RA is identifier information that the AP and the STA have agreed on in advance.

4. The STA according to claim 3, wherein the channel contention frame further comprises a transmitter address (TA), and wherein the TA is identifier information that the AP and the STA have agreed on in advance.

5. The STA according to claim 3, wherein the channel contention frame is a request to send (RTS) frame, a clear to send (CTS) frame, or a help-AP-to-send (HTS) frame.

6. An access point (AP), comprising:
   a transceiver;
   a processor; and
   a non-transitory computer-readable storage medium storing a program to be executed by the processor, the program including instructions for:
   receiving, via the transceiver, a channel contention frame sent by a first station (STA), wherein the first STA obtains a channel by contention by sending the channel contention frame, wherein a basic service set (BSS) comprises the AP and at least one STA, and wherein the at least one STA comprises the first STA;
   in response to receiving the channel contention frame, transferring scheduling control of the channel to the AP, and entering a scheduling mode; and
   sending a scheduling frame to maintain control of the channel, causing at least one of the AP or the at least one STA in the BSS to transmit data on the channel according to the scheduling frame, and causing a second STA to enter a waiting mode, wherein the second STA is not a member of the BSS, wherein the second STA starts to contend for the channel after the AP exits the scheduling mode, and wherein the scheduling frame is a control frame or a data frame.

7. The AP according to claim 6, wherein the channel contention frame comprises a transmission duration and a receiver address (RA), wherein the transmission duration is a scheduling duration for at least one of the AP or the first STA in the BSS, or a maximum duration allowed to be set, and wherein the RA is identifier information that the AP and the first STA have agreed on in advance.

8. The AP according to claim 7, wherein the channel contention frame further comprises a transmitter address (TA), and wherein the TA is identifier information that the AP and the first STA have agreed on in advance.

9. The AP according to claim 7, wherein the channel contention frame is a request to send (RTS) frame, a clear to send (CTS) frame, or a help-AP-to-send (HTS) frame.

10. A channel contention method, comprising:
    sensing, by a first station (STA) in a basic service set (BSS), a channel, wherein the BSS comprises an access point (AP) and at least one STA, and wherein the at least one STA comprises the first STA; and
    obtaining, by the first STA, the channel by contention by sending a channel contention frame when sensing that the channel is in an idle state; and
    transferring permission to control the channel to the AP in the BSS, and causing the channel to be centrally controlled and scheduled by the AP in the BSS.

11. The method according to claim 10, further comprising:

receiving a scheduling frame sent by the AP, wherein the scheduling frame is a control frame or a data frame; and transmitting data on the channel according to the scheduling frame.

12. The method according to claim 10, wherein the channel contention frame comprises a transmission duration and a receiver address (RA), wherein the transmission duration is a scheduling duration for at least one of the AP or the first STA in the BSS, or a maximum duration allowed to be set, and wherein the RA is identifier information that the AP and the first STA have agreed on in advance.

13. The method according to claim 12, wherein the channel contention frame further comprises a transmitter address (TA), and wherein the TA is identifier information that the AP and the first STA have agreed on in advance.

14. The method according to claim 12, wherein the channel contention frame is a request to send (RTS) frame, a clear to send (CTS) frame, or a help-AP-to-send (HTS) frame.

15. A channel contention method, comprising:
receiving, by an access point (AP) in a basic service set (BSS), a channel contention frame sent by a first station (STA) of at least one STA, wherein the BSS comprises the AP and the at least one STA, and wherein the first STA obtains the channel by contention by sending the channel contention frame;
in response to receiving the channel contention frame, transferring scheduling control of the channel to the AP, and entering a scheduling mode; and
sending, by the AP, a scheduling frame to centrally control and schedule the channel, so that at least one of the AP or the at least one STA in the BSS use the channel to transmit data, and so that a second STA enters a waiting mode, wherein the second STA is not a member of the BSS, wherein the second STA starts to contend for the channel after the AP exits the scheduling mode, and wherein the scheduling frame is a control frame or a data frame.

16. The method according to claim 15, wherein the channel contention frame comprises a transmission duration and a receiver address (RA), wherein the transmission duration is a scheduling duration for at least one of the AP or the first STA in the BSS, or a maximum duration allowed to be set, and wherein the RA is identifier information that the AP and the first STA have agreed on in advance.

17. The method according to claim 16, wherein the channel contention frame further comprises a transmitter address (TA), and wherein the TA is identifier information that the AP and the first STA have agreed on in advance.

18. The method according to claim 16, wherein the channel contention frame is a request to send (RTS) frame, a clear to send (CTS) frame, or a help-AP-to-send (HTS) frame.

19. The STA according to claim 3, wherein the RA comprises a Media Access Control (MAC) address of the AP.

20. The STA according to claim 4, wherein the RA comprises a Media Access Control (MAC) address of the AP and wherein the TA consists of a MAC address of the STA, a MAC address of the AP, or an identifier of the BSS.

21. The AP according to claim 6, wherein sending the one or more scheduling frames comprises:
sending a first scheduling frame addressed to each STA of the at least one STA, wherein the scheduling frame comprises:
a receiver address (RA) comprising an identifier of the BSS; and
a transmitter address (TA) comprising a Media Access Control (MAC) address of the AP.

22. The AP according to claim 6, wherein sending the one or more scheduling frames comprises:
sending a first scheduling frame addressed to a group comprising a portion of the at least one STA, wherein the scheduling frame comprises:
a receiver address (RA) comprising an identifier of the group; and
a transmitter address (TA) comprising a Media Access Control (MAC) address of the AP.

23. The AP according to claim 7, wherein the RA comprises a Media Access Control (MAC) address of the AP.

24. The AP according to claim 8, wherein the RA comprises a Media Access Control (MAC) address of the AP and wherein the TA consists of a MAC address of the first STA, a MAC address of the AP, or an identifier of the BSS.

* * * * *